United States Patent [19]
Bosse et al.

[11] Patent Number: 6,023,348
[45] Date of Patent: Feb. 8, 2000

[54] ROTARY IMAGE SCANNER CAPABLE OF MOUNTING DRUMS OF VARIOUS DIAMETERS

[75] Inventors: Thomas W. Bosse, Salem, Mass.; Mark W. Magee, Derry; Richard F. Lehman, Nashua, both of N.H.; Calvin Winey, III, Carlisle, Mass.

[73] Assignee: Howtek, Inc., Hudson, N.H.

[21] Appl. No.: 08/324,898

[22] Filed: Oct. 18, 1994

[51] Int. Cl.$^7$ .................................................. H04N 1/04
[52] U.S. Cl. .................. 358/489; 358/490; 358/484; 355/1; 385/115
[58] Field of Search .................. 358/489, 487, 358/490, 491, 493, 296, 474, 484, 494, 483; 250/233, 578.1, 227.26, 234, 235, 230; 359/17, 862, 873, 226, 196; 347/108

[56] References Cited

U.S. PATENT DOCUMENTS

| | | | |
|---|---|---|---|
| 4,260,998 | 4/1981 | Fukui | 358/491 |
| 4,654,526 | 3/1987 | Nakaji | 358/490 |
| 4,870,504 | 9/1989 | Ishida et al. | 358/489 |
| 4,897,737 | 1/1990 | Shalen | 358/490 |
| 4,933,779 | 6/1990 | Milch | 358/489 |
| 5,289,307 | 2/1994 | Oldershaw | 358/490 |
| 5,317,424 | 5/1994 | Aotani | 358/490 |
| 5,367,769 | 11/1994 | Searcy et al. | 29/895.22 |
| 5,448,289 | 9/1995 | Yoshizawa | 358/490 |

*Primary Examiner*—Edward L. Coles, Sr.
*Assistant Examiner*—Madeleine Nguyen
*Attorney, Agent, or Firm*—Cesari and McKenna, LLP

[57] ABSTRACT

A dual drum rotary image scanner has a headstock and a tailstock between which may be mounted drums of different diameter. The tailstock has substantially annular surfaces which contact corresponding surfaces on the different diameter drums. The different drums, when held in the scanner, each create a different separation between the headstock and tailstock. These different separations are detected by photodetectors, the outputs of which are received by a system controller. The controller uses the photodetector signals to control motors that position the scanning head and the transmittance illuminator relative to the surface of the particular drum mounted in the scanner. The motors turn pinions which, in turn, move racks to which are attached the scanning head and the transmittance illuminator, respectively. The movement of the scanning head also results in the modification of the optical path within the optics box of the scanner. In a first position, the light from the scanning head follows a first optical path which includes a movable mirror in a first angular orientation. As the scanning head is moved to a second position, the angular orientation of the movable mirror is changed, and the light from the scanning head follows a second optical path which includes the movable mirror in its new orientation. Support arms are also provided which adjust to support the different diameter drums during loading, and mounting surfaces between the drum being mounted and the headstock and tailstock are shaped to allow the drum to be lifted off the supports as the headstock and tailstock are brought together.

69 Claims, 10 Drawing Sheets

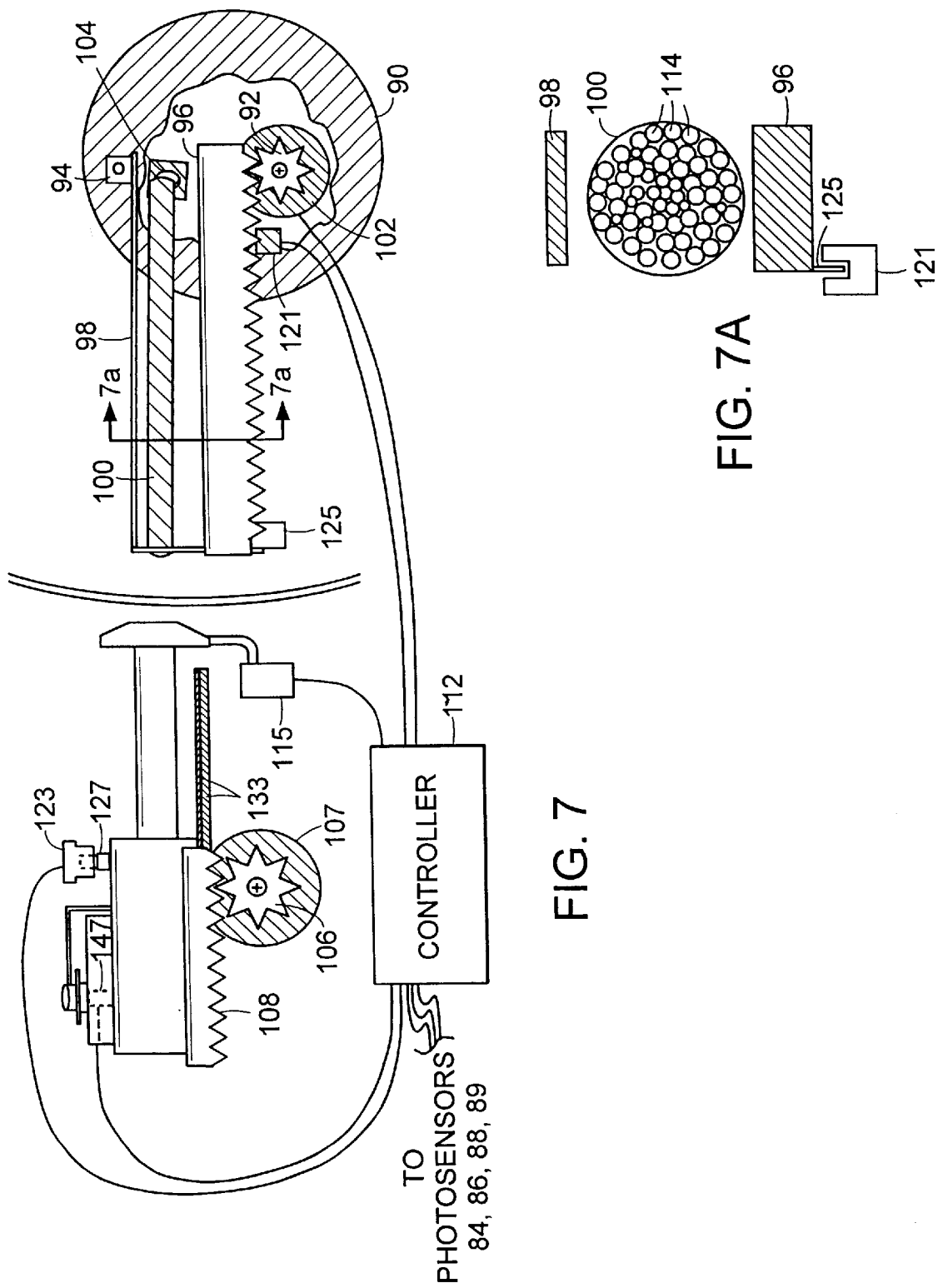

ROTARY IMAGE SCANNER CAPABLE OF MOUNTING DRUMS OF VARIOUS DIAMETERS

BACKGROUND OF THE INVENTION

1. Field of the Invention

The present invention relates to the field of image scanning and, more particularly, to rotary scanners having rotating drums on which documents to be scanned are mounted.

2. Description of the Prior Art

Rotary drum scanners have been used for many years for image scanning due to the high resolution and high quality which they attain. These scanners were traditionally of two types, reflectance scanners and transmittance scanners. In both types, a document bearing an image to be scanned is mounted on a drum which rotates in the scanner, while an optical head is directed at the document to collect light and direct it to an optics box which converts it into a signal stream. While the drum rotates, it is gradually moved parallel to its rotational axis. The signal output by the optics box is thus representative of a line-by-line raster scan of the document.

Depending on the type of scanning (i.e. reflectance or transmittance), a light source is located either outside the drum, or within it. With a transmittance type scanner, the document being scanned is on a transparency, and the drum is translucent such that a light source from within the body of the drum transmits light through the surface of the drum and through the transparency being scanned. The light source is directed at the scanning head, and remains fixed in position relative thereto as the drum moves along its axial path.

In a reflectance type scanner, the light source is usually located outside of the drum, adjacent to or integral with the scanning head. The document being scanned is not a transparency, but is opaque and reflects light from the light source. Some of the reflected light reaches the scanning head, which collects it and directs it to the optics box. The drum need not be transparent for the reflectance type of scanner but, of course, it may very well be so. In both types of rotary scanners, the output scanning signal of the optics box may be analyzed, stored and/or used to assemble the final desired image.

Some modern scanners accommodate both reflectance and transmittance type of scanning using a translucent drum and light sources located both within the drum and outside of it. A scanning head outside of the drum receives image data either reflected from the surface of the scanned page or transmitted through the page, depending on whether it is operating in reflectance mode or transmittance mode.

More recently, rotary drum scanners have been designed to support drums of more that one diameter. Drum size is an important factor in scanner versatility. It dictates the available imaging area which, in turn, defines the maximum size original that can be scanned. Users that must scan large originals have no alternative to buying a scanner that will accommodate their maximum size original. However, at high resolutions, there is an inverse relationship between drum size and scanner throughput. The larger the drum, the longer the scan time. Consequently, having two drum sizes, one for large originals and one for higher throughput, provides greater flexibility. While the versatility of having two different drum diameters with the same scanner has proved popular, the actual support and control of the different diameter drums amounts to a complicated task. A precise and stable support mechanism is required which can support and drive each of the drums and which allows the interchange of drums with a minimum of effort.

Another problem specific to dual drum scanners involves the positioning of the light source and detection elements. Whether a scanner is of a transmittance type or a reflectance type (or accommodates both types), the position of the scanning head and the illuminating mechanism (whether reflectance or transmittance) must be adjusted to accommodate the particular drum being used.

SUMMARY OF THE INVENTION

A rotary image scanner of the present invention is capable of operating with either one of multiple drums having different diameters. In the preferred embodiment, the scanner accommodates one of two different sized drums in either a transmittance or a reflectance mode. One drum at a time is held between the headstock and tailstock, which are designed to accommodate either drum size. The connection of each drum to the headstock is essentially the same, being held by a centered, tapered mounting stud and an off-center drive pawl. The tailstock, however, comprises multiple, substantially annular surfaces each of which fits against a contact surface of one of the drums.

A first substantially annular surface of the tailstock is tapered and sized to contact an outwardly curved surface of a first drum of a first diameter. In the preferred embodiment, the curved surface of the first drum approximates a spherical segment. A second substantially annular surface of the tailstock is sized to contact an inwardly tapered surface of a second drum of a second, larger diameter. In the preferred embodiment, the second surface of the tailstock approximates a spherical segment. By fitting tapered surfaces against spherical surfaces in the tailstock/drum connections, the contact is substantially linear, as opposed to surface-to-surface.

During the mounting of a drum, the drum being mounted is supported by a plurality of support arms. In the preferred embodiment, a first drum, of a comparatively small diameter, is supported by the "Y"-shaped upper supports of two support arms in their upright position. When mounting a second drum of a second, larger diameter, the support arms are moved about a pivoting connection to fold them down into a second, collapsed position. In this second position, concave lower supports of the support arms are positioned with their concave surfaces facing upward so that the surfaces cradle the larger drum.

When a drum is being mounted on the scanner, the headstock and tailstock (forming two parts of a carriage which moves along the length of the scanner during scanning) are separated to allow the drum to be placed between them. To separate the headstock and tailstock, a separation mechanism is activated, forcing the headstock and tailstock apart against the bias of a plurality of springs. In the preferred embodiment, the separation mechanism is a cam which is controlled by a cam lever. Once the support arms have been placed in the appropriate position for the drum being loaded, the drum is placed on the support arms between the headstock and tailstock. The separation mechanism is then reversed to allow the force of the springs to draw the headstock and tailstock together, pressing the drum between them.

The support arms keep the drum elevated sufficiently to allow the tapered surface of the right side of the drum to engage the particular tapered surface of the tailstock intended for that drum while the carriage is closing. The elevation is also sufficient to allow contact between the tapered mounting stud of the headstock and the corresponding mounting hole of the drum while the carriage is closing. As the drum is compressed between the headstock and the tailstock, the contact between the various tapered (and spherical) surfaces draws the drum upward, lifting it off of the support arms and into a scanning position. In the scanning position, the drum is firmly held between the headstock and tailstock, and is ready to be rotated.

Along with engaging the mounting stud of the headstock, the drum also engages a drive pawl. The drive pawl allows for easy translation of the rotational force of a drive wheel of the scanner to the drum. Because the drive pawl is off-center, the drum, while resting on the support arms, is aligned with the drive pawl using an alignment mark on the drum. The drum is positioned by a user with the drum alignment mark aligned with a corresponding alignment mark on a drive wheel of the headstock to assure that the drive pawl will engage the drive hole of the drum.

The drive hole of the drum comprises a chamfered hole formed by two stops, each having a somewhat semicircular cavity along one side. The cavities of the two stops line up with each other to form a single chamfered hole. While a first stop is fixed in position, and abuts a rigid surface, a second stop is movable, and is spring-biased toward the first stop. This allows the two stops to be separated, and the chamfered hole to be opened against the bias of the spring. When the drum is in place, and the separation mechanism is activated to allow the headstock and tailstock to contact the drum and lift it into the scanning position, the drive pawl engages the chamfered hole, opening it against the bias of the stop spring. Once the drum has been drawn into place by the mounting stud and the appropriate tapered surface of the tailstock, the drive pawl is better aligned with the chamfered hole and the movable stop, together with the fixed stop, fits snugly around the drive pawl.

In one embodiment of the scanner of the present invention, photosensors are provided which detect the position of the headstock and tailstock relative to each other. Depending on which drum is loaded in the scanner, and whether the carriage is opened or closed, the separation between the headstock and tailstock is different. Three photosensors are positioned so that one or more of them is obstructed by a "flag" of the tailstock, depending on whether the carriage is open and if it is not, which, if either of the drums is mounted in the scanner.

In the preferred embodiment, the photosensors are in a fixed position relative to the body of the scanner, such that they do not move with the carriage. As such, they detect the relative positions of the headstock and tailstock only when the carriage is in a "home" position (typically all the way to the left in the scanner). An additional photosensor, the "home" sensor, is fixed relative to the body of the scanner and is obstructed by a flag of the headstock when the carriage is in the home position.

The obstruction of the photosensors detectably changes their output signals, which are input to a controller. Depending on the particular combination of carriage photosensor outputs, the controller can determine whether the carriage is open or closed and, if closed, which drum, if any, is mounted on the scanner. With the home sensor, the controller can also detect when the carriage is in the home position. In the preferred embodiment, the controller controls a solenoid latch on a cover of the scanner. When the signal from the home sensor indicates that the carriage is not in the home position, the solenoid is moved to the latch position to keep the cover locked.

In either the transmittance mode or a reflectance mode, the scanning head which collects light from the surface of the drum must be positioned so that it properly focuses on the surface of the drum. Similarly, when in the transmittance mode, the transmittance illuminator on the inside of the drum must be properly positioned adjacent the surface of the drum. In both cases, the use of drums of different diameters requires that the scanning head and the transmittance illuminator be positioned differently for each of the two drums.

In the preferred embodiment, the transmittance illuminator uses a fiber optic bundle which carries light from a light source located on a center arm of the scanner. The transmittance illuminator and the scanning head are each mounted on a different rack, each rack being part of a different rack and pinion gear assembly. The two racks are each translatable frontwards and backwards in the scanner (i.e. toward and away from the rotational axis of the drum). The pinion gear of each rack and pinion assembly is controlled by the controller to move the rack it drives to the position appropriate for the drum being scanned.

The reflectance illuminator is also a fiber optic bundle in the preferred embodiment. The fiber bundle is split into four smaller bundles which surround an objective lens of the scanning head, each smaller bundle directing light toward the focal point of the objective lens. Preferably, the optical fiber used has a low numerical aperture to reduce the angle of incidence of light from the fibers on the surface of the drum. This allows the fiber bundles to be angled more normal to the surface of the drum (providing better illumination) without having specularly reflected light from the inner and outer surfaces of the drum reaching the pixel aperture of the optics box during calibration. A black anodized coating and annular baffles within the scanning head also helps prevent stray light noise from reaching the pixel aperture.

Because the optics are located toward the rear of the scanner, the preferred embodiment requires that the scanning head and transmittance illuminator be moved toward the rear of the scanner for the larger diameter drum, and toward the front of the scanner for the smaller diameter drum. The preferred embodiment of the present invention uses the signals of the carriage photosensors to automatically adjust the positions of the scanning head and the transmittance illuminator. At the start of a scan, the controller determines which of the drums (if any) is loaded onto the scanner based on the photosensor output signals. The positions of the scanning head and transmittance illuminator are then adjusted for the drum which has been loaded onto the scanner. The controller supplies power, as necessary, to the motors driving the pinion gears with a polarity which results in the racks moving into the appropriate position for scanning that particular drum.

The scanning head and transmittance illuminator also have a "safe" position to which they move when the scanner is not in a scanning mode. In the preferred embodiment, the safe position is with the scanning head in its rearmost position and the transmittance illuminator in its frontmost position. As such, both are clear of the expected location of either drum surface. A photosensor may also be provided with each of the scanning head and the transmittance illuminator. Each photosensors is positioned such that its output changes when the element it detects (i.e. the scanning head or the transmittance illuminator) is in the safe position. The controller receives the outputs of these photosensors and uses them to confirm that these elements are in the safe position.

The scanning head relays light to an optics box which contains the optical elements typical for conventional rotary scanners. The preferred embodiment of the invention provides a slide mechanism which connects the scanning head and the optics box. The slide mechanism allows the scanning head to move with the rack and pinion system, while the optics box remains stationary. The light collected by the scanning head is reflected off a scanning head mirror within the scanning head, which also moves with the slide mechanism. Depending on the position of the scanning head, the light reflected from the scanning head mirror is directed to the remainder of the optical components along one of two optical paths.

When the rack and pinion move the scanning head to its frontmost position, the light reflected from the scanning head mirror is again reflected by a first stationary mirror to a movable mirror. The light from the movable mirror is redirected to the components of the optics box.

When the rack and pinion move the scanning head to its rearmost position, the movable mirror pivots to a new orientation, preferably 90° relative to its previous orientation. In the new scanning head position, the light reflected by the scanning head mirror is reflected toward a second stationary mirror which, in turn, reflects it to the movable mirror. Because of the new orientation of the movable mirror, it receives the light from the second stationary mirror, and reflects it along the same path as it had reflected light from the first stationary mirror when the scanning head was in its first position. Thus, the remainder of the optical components receive light from the scanning head along the same path regardless of which drum is being scanned.

BRIEF DESCRIPTION OF THE DRAWINGS

FIG. 7 is a side view of a transmittance mode illuminator and a scanning head of the scanner of FIG. 1.

FIG. 7A is a cross section of the fiber optic bundle of the illuminator of FIG. 7.

DETAILED DESCRIPTION OF A PREFERRED EMBODIMENT

Figure 1:
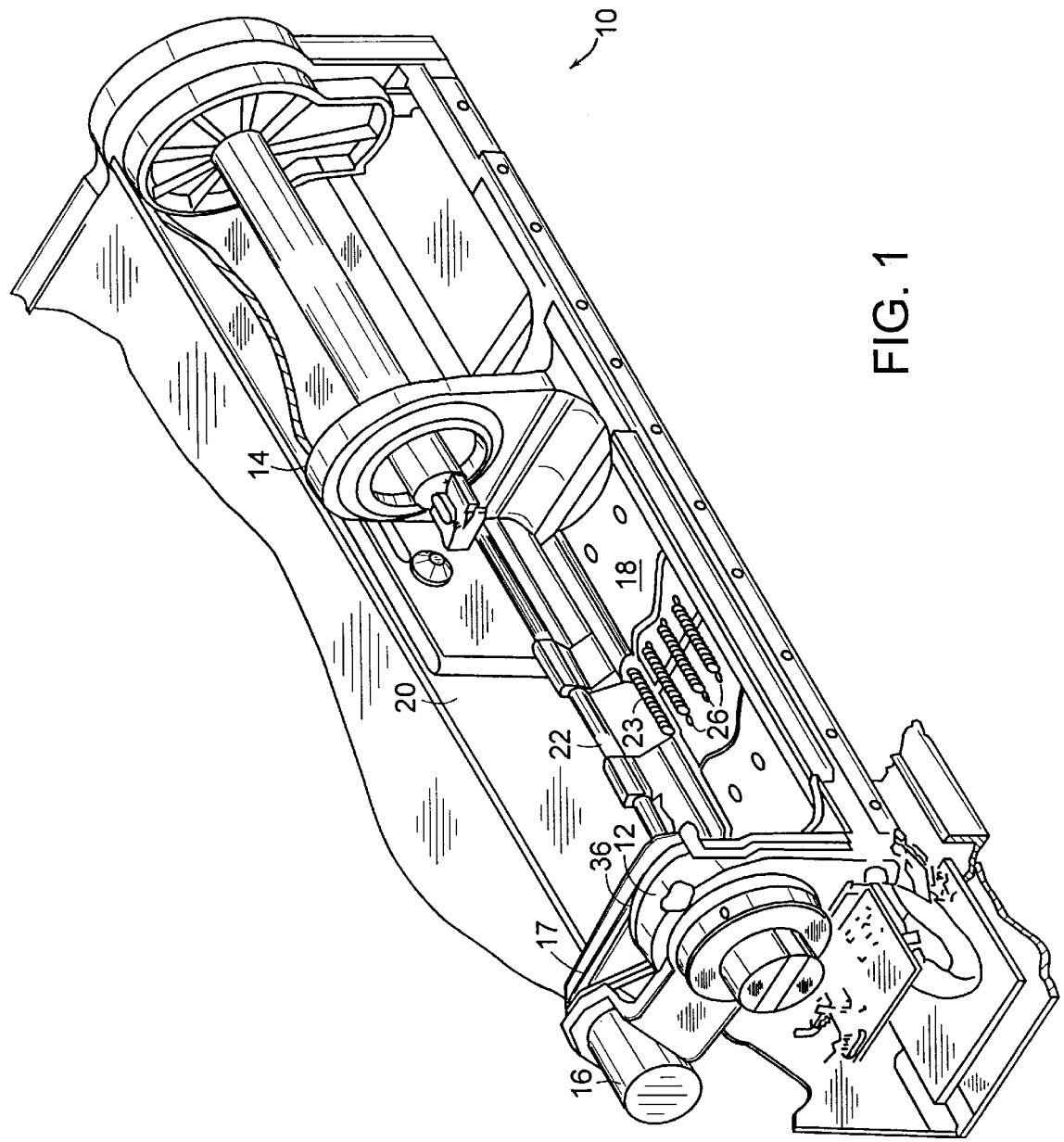
FIG. 1 is an isometric view of a rotary image scanner according to the present invention.

Shown in FIG. 1 is a dual-drum rotary image scanner 10 having a headstock 12 and a tailstock 14 between which one of two different drums may be mounted. The two drums are of different diameters and each may be accommodated by the scanner. When a drum is mounted between the headstock and tailstock, a drive motor 16 connected by at least one belt 17 to a drive wheel 36 of the headstock 12 is powered to rotate the drum at a high rate of speed. Consequently, a document mounted on the outer surface of the drum also rotates with the drum.

The headstock and tailstock are each mounted on a different portion of carriage 18, which is connected to a frame 20 of the scanner by guide rod 22. As a drum mounted between the headstock 12 and tailstock 14 is rotated by drive motor 16, a lead screw drive 23 moves the carriage 18 in a direction parallel to the axis of rotation of the drum, such that the surface of the drum passes before a stationary scanning head 24.

The carriage includes a spring-biased connection between the headstock 12 and the tailstock 14. This connection allows the headstock and tailstock to be separated such that a drum may be mounted onto or removed from the scanner. This spring-biased connection is discussed in more detail hereinafter. However, while the headstock 12 and tailstock 14 are holding a drum between them, the two portions of the carriage are held together by springs 26, allowing the carriage to move as a single unit along the length of the scanner frame.

Drum Mounting

Figure 2A:
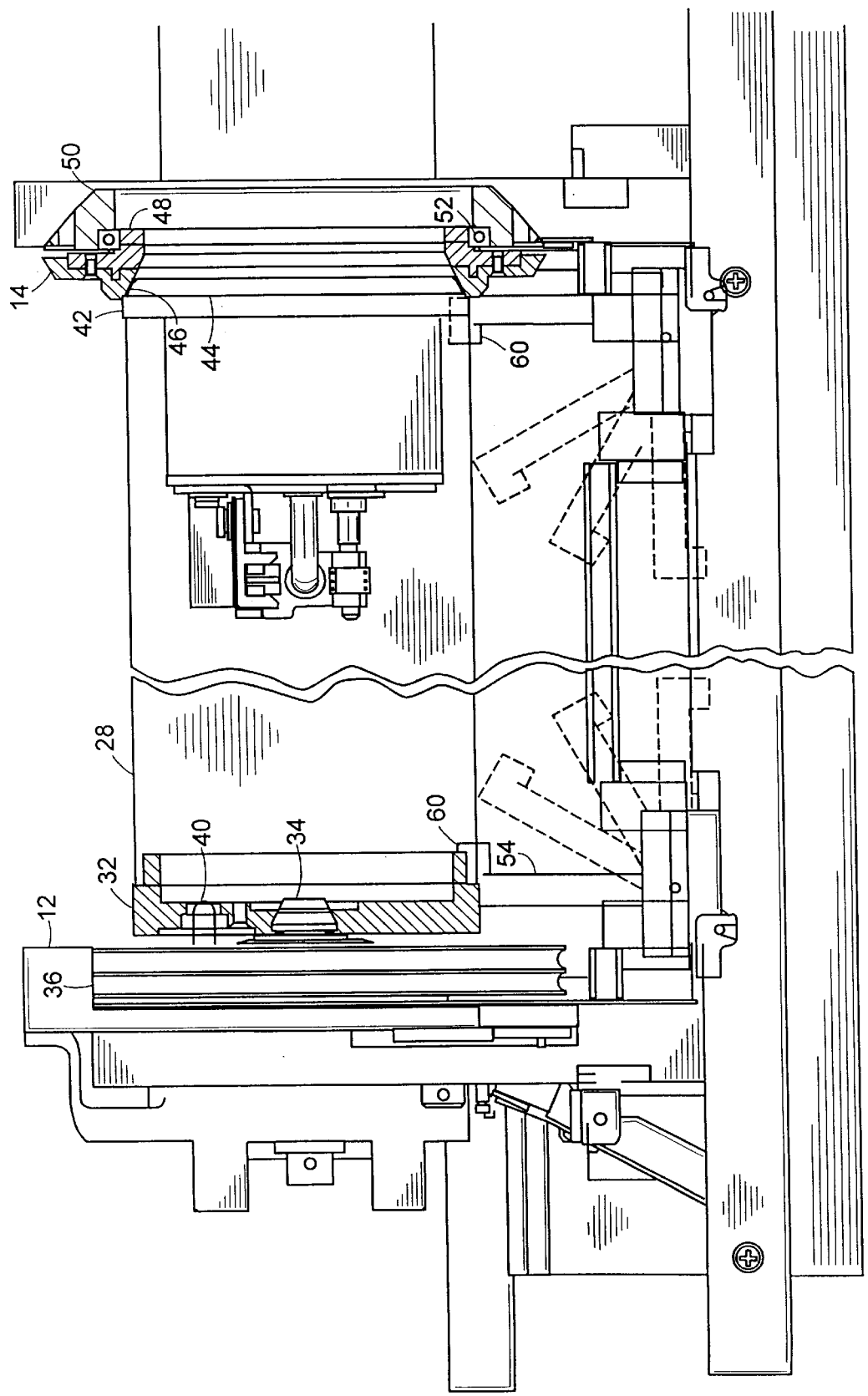
FIG. 2A is a cross-sectional front view of the scanner of FIG. 1 with a drum of a first diameter mounted thereon and with a break line separating the two sides of the scanner.

FIG. 2A is a cross-sectional front view showing the scanner of FIG. 1 with a four inch (4") diameter drum 28 mounted between headstock 12 and tailstock 14. The drum 28 is cylindrically-shaped and, when loaded on the scanner, is held firmly between the headstock 12 and tailstock 14. For clarity, the center portion of scanner 10 is omitted from the figure and replaced by a break line, to allow the headstock and tailstock to be shown in greater detail. It will be understood by those skilled in the art that the surface of the drum is continuous and cylindrical over the area replaced by the break line. As will be described, the two sides of the drum are constructed differently to facilitate their connection to the headstock and tailstock.

The headstock side 32 of the drum (the "left" side) is mostly solid, but has a tapered mounting hole which receives tapered mounting stud 34. The mounting hole is centered about a longitudinal axis of the drum 28. The mounting stud 34 is attached to drive wheel 36 which is driven by a belt from drive motor 16. The left side 32 of the drum 28 also has a chamfered drive hole 38 which is offset from the center line of the drum, and which receives a drive pawl 40. Like the mounting stud 34, the drive pawl 40 is rigidly fixed to the drive wheel 36 such that, as the drive wheel 36 is rotated by the drive motor 16, the drum 28 is also rotated about its longitudinal axis.

The tailstock side 42 (the "right" side) of the drum 28, unlike the left side, has a shape which approximates a spherical segment, the diameter of which gets smaller away from the cylindrical surface of the drum 28. When the carriage is closed (bringing the headstock 12 and tailstock 14 toward each other), the outer spherical surface 44 of the right side of the drum contacts inner tapered surface 46 of tailstock 14. The shape of these surfaces provides a circular line of contact between them. The invention may also use two tapered (or otherwise compatibly shaped) surfaces, but the spherical/tapered contact is preferred because it helps to reduce misalignment of the drum relative to the tailstock. Regardless of the shape, the surfaces must provide the necessary support to the right side of the drum 28 to keep it from changing position in an axial direction relative to the rotational axis of the drum 28.

A rotatable portion 48 of the tailstock is free to rotate about the rotational axis of the drum, and is supported by a bearing 52 which is held within non-rotating portion 50 of the tailstock 14. A precise tolerance is maintained between the two portions 48, 50 of the tailstock 14 to prevent any deviation of the drum from its intended rotational axis.

Figure 3:
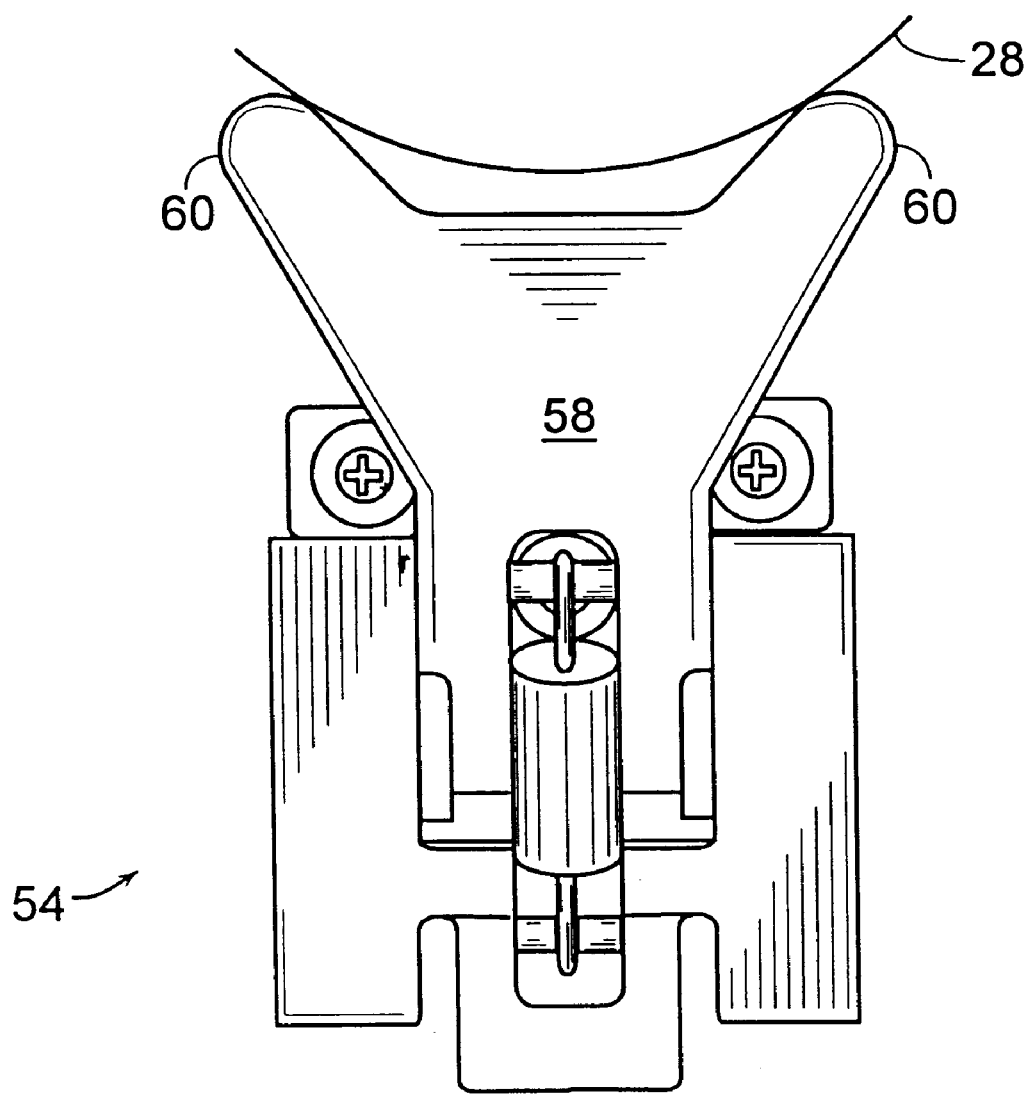
FIG. 3 is a side view of one of two support arms of the scanner of FIG. 1.

During the loading of the drum 28, the drum is supported by two support arms 54, 56 which are pivotably connected to the carriage 18 in an opposite orientation relative to each other. FIG. 3 shows a side view of support arm 56 and is equally representative of a side view of support arm 54 from an opposite direction. The support arms 54, 56 are each substantially "Y"-shaped, having a vertical support 58 from which arms having rounded heads 60 branch out. When the support arms 54, 56 are in the upright position, the heads 60 of each support arm are oriented such that they are equally spaced to either side of the lowest part of the drum surface. More specifically, each pair of heads 60 cradles the drum, supporting it from below. Thus, when the 4" drum is loaded into the scanner, it is placed on the cradles formed by the pairs of support heads 60.

The 4" drum 28 is loaded into the scanner 10 when the carriage is in the open position (i.e. when the headstock 12 and tailstock 14 are considerably farther apart than the length of the drum). Prior to placing the drum 28 in the scanner, the support arms 54, 56 are manually raised to their upright position. The drum is then placed on the heads 60 of the support arms, which keep the drum roughly aligned with the headstock 12 and tailstock 14, except for being slightly lower than the position in which the drum is held when the carriage is closed. It is the annular metal sides of the drum which actually contact the support arms (as opposed to the transparent surface) to avoid scratching the transparent surface of the drum. When the carriage is closed, the tapered surface of mounting stud 34 and the tapered surface 46 of the tailstock engage the tapered surface of the mounting hole on the left side of the drum, and the spherical segment surface on the right side of the drum, respectively. As the headstock 12 and the tailstock 14 are drawn together under the force of springs 26, the contact between these surfaces cause the drum 28 to be lifted upward into the normal scanning position in which it is held coaxial with the mounting stud 34.

Each support arm 54, 56 is free to pivot about a connection point along its base. The range of motion for each support arm is 90°. This pivoting connection allows them to be in either an upright or a collapsed position. In FIG. 2A, the pivoting action of the support arms 54, 56 is demonstrated by the broken line representations of various arm positions. Prior to loading the 4" drum, the support arms are placed in their upright position. However, as will be described hereinafter, the support arms 54, 56 are placed in their collapsed position prior to the loading of a larger diameter drum.

Figure 2B:
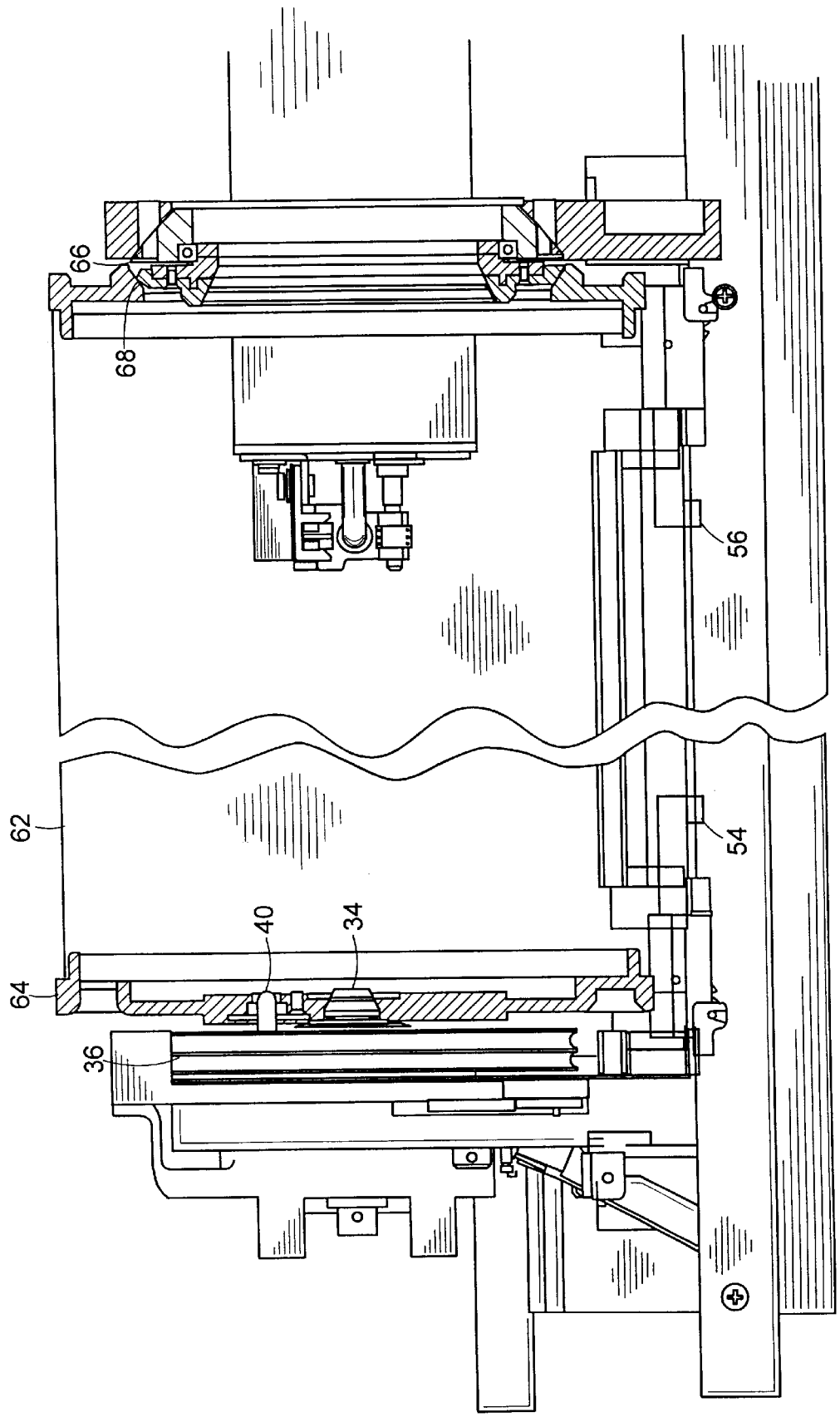
FIG. 2B is a cross-sectional front view of the scanner of FIG. 1 with a drum of a second diameter mounted thereon and with a break line separating the two sides of the scanner.

FIG. 2B shows the scanner 10 with an eight inch (8") diameter drum 62 being held between headstock 12 and tailstock 14. As in FIG. 2A, the center portion of scanner 10 is omitted in FIG. 2B, and replaced with a break line to allow the sides of the scanner to be shown in greater detail. The left side 64 of drum 62, like that of drum 28, is mostly solid. However, it has a tapered hole for mounting stud 34 as well as a drive hole for drive pawl 40. In fact, the eight inch drum 62 is rotated in the same manner as the 4" drum 28. A belt from the drive motor 16 rotates the drive wheel 36 which, in turn, rotates drum 62.

The right side 66 of drum 62 is supported by the rotating portion of tailstock 14. Like the 4" drum, the connection between the tailstock and the drum is one of a spherical surface contacting a tapered surface. However, while the 4" drum 28 is supported by an inwardly-facing surface of the tailstock, the 8" drum 62 is supported by an outwardly-facing surface 68. For this reason, the surface 66 of the drum, while being somewhat annularly shaped, is provided with a taper for which the diameter decreases away from the cylindrical body of the drum. Correspondingly, surface 68 of the tailstock approximates a spherical segment to give the desired linear contact between the drum and tailstock. Again, other shapes for the matching surfaces could be used, but the spherical/tapered point of connection is preferred.

Prior to loading the 8" drum on the scanner, the support arms 54, 56 are placed in their collapsed position. In this position, lower supports 70 (shown in FIG. 3) of each of the support arms 54, 56 are oriented so that they form a concave surface facing upward. That is, the lower supports are "U"-shaped and parallel to each other, with the open side of the "U" facing upward. In this position, the concave surfaces of the lower supports 70 follow the contour of the surface of the 8" drum when it is loaded into the scanner.

When loading the 8" drum into the scanner, the drum is placed such that its left side 64 and its right side 66 each rest on the concave surface of one of lower supports 70. As with the top of support arms 54, 56, the spacing between the lower supports 70 (when the support arms are in the collapsed position) is equal to the spacing between left side 64 and right side 66 of drum 62. This allows the drum 62 to be placed with its non-transparent sides resting on the supports 70, thus avoiding scratching of the transparent drum surface during loading.

Just as the top of support arms 54, 56 keep the 4" drum elevated slightly below the normal scanning position of the drum, lower supports 70 likewise keep the 8" drum elevated slightly below its normal scanning position. When the carriage 18 is then closed, the tapered surfaces of mounting stud 34 and the matching mounting hole of the drum 62, and the spherical surface 68 of the tailstock and the mating tapered surface 66 of the drum 62 contact each other, and cause the drum 62 to be lifted into the normal scanning position. Thus, as the drum 62 is subsequently rotated by the drive wheel 36, it remains well clear of lower supports 70.

Figure 4:
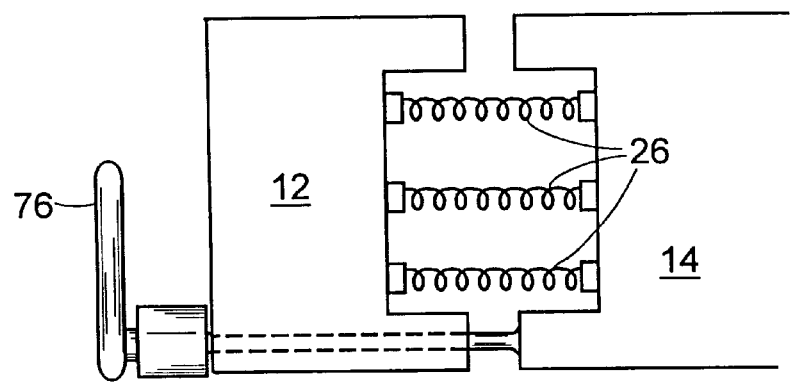
FIG. 4 is a schematic top view of a carriage assembly of the scanner of FIG. 1.

FIG. 4 is an isolated top view of a bottom portion of each of headstock 12 and tailstock 14. As shown, the base portions of the headstock 12 and tailstock 14 are joined together by three springs 26. The tension of the springs biases the headstock 12 and tailstock 14 toward each other, so that they move together as a single carriage 18. The headstock 12 and tailstock 14 can be separated against the bias of the springs 26 by moving carriage lever 76. The carriage lever 76 operates a separation mechanism 74 which causes the extension of push rod 75 when moved by a user.

The extension of push rod 75 forces the tailstock to the right, while the headstock remains stationary, restricted to its current position with regard to screw drive 23. The engaging mechanism 74 may be a mechanical cam or an electromechanical device capable of forcing push rod 75 to the right. In a first position, the headstock 12 and the tailstock 14 are held apart by the force of the separation mechanism 74 at a distance sufficient to allow unrestricted placement of a drum in the scanner. In a second position, the force on the push rod is removed and the headstock and tailstock are drawn together by the spring tension until they contact each other.

In the first position, the carriage is "open" and a user places the support arms 54, 56 in the correct position for the selected drum, and places the drum on them. The user then moves lever 76 to shift the carriage to the second position. The spring force then causes the drum to engage the tapered surface of the mounting stud 34 and the applicable surface 46, 68 of the tailstock, and the drum is drawn into the scanning position, as described above.

As the left side of the drum engages the mounting stud 34, it must also engage the drive pawl 40 of headstock 12. However, since the drive pawl is off-center, the drum must be aligned with the drive wheel 36 before closing the carriage. An alignment mark on the drum is matched to an alignment mark on the drive wheel 36 by proper positioning of the drum on the support arms 54, 56. The carriage is then closed, and the drive pawl properly enters the drive hole.

Figure 5:
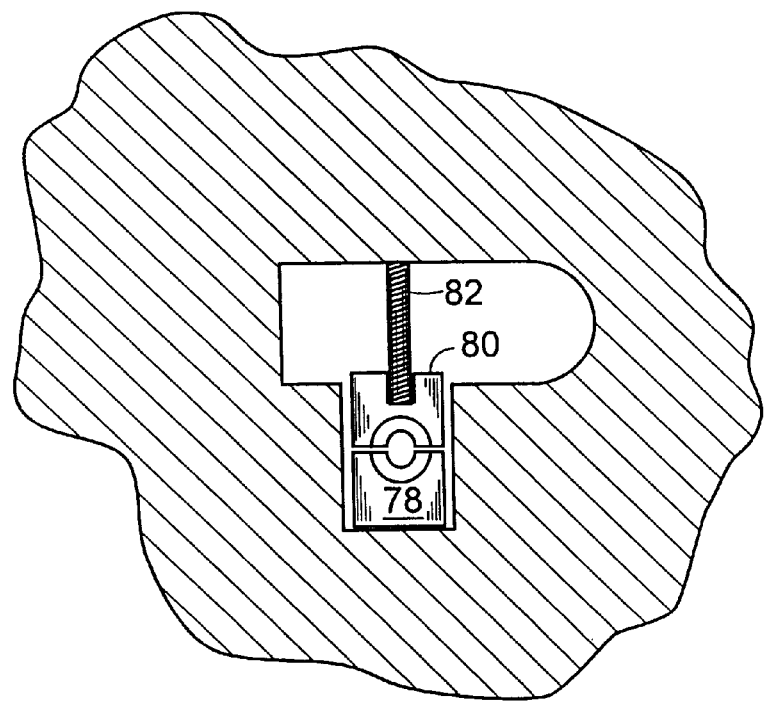
FIG. 5 is an isolated side view of a pawl-receiving mechanism of a drum used with the scanner of FIG. 1.

FIG. 5 is an isolated side view of a drive pawl engaging mechanism which is located in a recess on the left side of each drum 28, 62. The mechanism consists of a chamfered hole formed by a stationary stop 78 and a movable stop 80. The stationary stop remains pressed against a wall of the slot, kept in place by contact with the movable stop 80 and the bias of spring 82.

When the drum is loaded onto the support arms 54, 56, and the alignment marks 81, 83 are matched, the drum is slightly below the normal scanning position and, therefore, the chamfered hole is out of line with the drive pawl 40. However, the alignment is such that the drive pawl 40 still contacts part of the chamfered hole off-center as the drum is brought into engagement with the headstock. That is, as the lever 76 is moved to shift the carriage 18 from the second position to the first position, the drive pawl is contacted by the movable stop 82, which moves to compress spring 82 to allow entry of the drive pawl 40 between the two stops 80, 82. As the drum is thereafter raised into the scanning position, the spring 82 again draws the two stops 80, 82 together, and the drive pawl 40 fits snugly within the chamfered hole.

Proper selection of spring 82 is important to avoid relative motion between the drum and the drive mechanism. At the maximum speed of either drum, a force is exerted against the movable stop by the drum's rotation. The spring tension is therefore selected to exceed the amount of the rotational force without being so great as to overcome the force of springs 26 which draw the headstock 12 and tailstock 14 together. For example, if the maximum rotational force imparted to the movable stop 80 by the drum is nine pounds, and a spring force of fifteen pounds provided by spring 82 is the minimum force which would overcome the force provided by springs 26 (and thus prevent the drive pawl 40 from displacing the movable stop 80 upon closing the carriage), then a tension of twelve pounds for spring 82 would be appropriate. This spring tension would then be weak enough to allow the springs 26 to force the drive pawl into the chamfered hole, but strong enough to overcome the rotational force of the drum and avoid relative motion between the drum and drive mechanism.

Schematically shown in FIGS. 6A–6D are the different positions of the carriage 18 which are possible with the scanner of the present invention. The different positions of the carriage are sensed by a series of three photosensors 84, 86, 88 attached to the rear inside wall of the scanner. In the preferred embodiment; the photosensors include an LED and a photodiode which are separated by a small space. The photosensors are positioned on the scanner such that, depending on the relative position of the headstock 12 and tailstock 14, an upright flat surface (referred to as a "flag") of the tailstock may obstruct the light path between the LED and the photodiode on one or more of the photosensors 84, 86, 88. This results in the output signals of the obstructed photosensors changing to indicate the interruption by the tailstock 14.

An additional photosensor 89 (referred to as the "home" sensor) is also rigidly affixed to the back inside surface of the scanner 10. The home sensor is obstructed by an upright flat surface (i.e. "flag") of the headstock when the carriage 18 is all the way to the left in the scanner in what is termed the "home" position. This is the position shown in FIGS. 6A–6D and, as such, the home sensor 89 is shown in broken lines since it is obstructed by the headstock flag. The output of home sensor indicates when the carriage is in the home position, and therefore when the drum may be loaded or unloaded without interference from the center arm 90.

The tailstock flag is rigidly connected to the body of the tailstock and therefore moves with it. The photosensors 84, 86, 88 are attached to the back of the scanner and are precisely positioned such that their output signals may be used to determine the relative separation between the headstock and tailstock when the carriage is in the "home" position. As such, these "carriage" photosensors also indicate the status of the carriage (i.e. open or closed), and whether either of the drums is mounted on the scanner. The four different sensed positions of the preferred embodiment are demonstrated by FIGS. 6A–6D. Each of these figures shows the headstock 12 and tailstock 14 generally, and may also show one of the drums 28, 62 where appropriate.

Figure 6A:
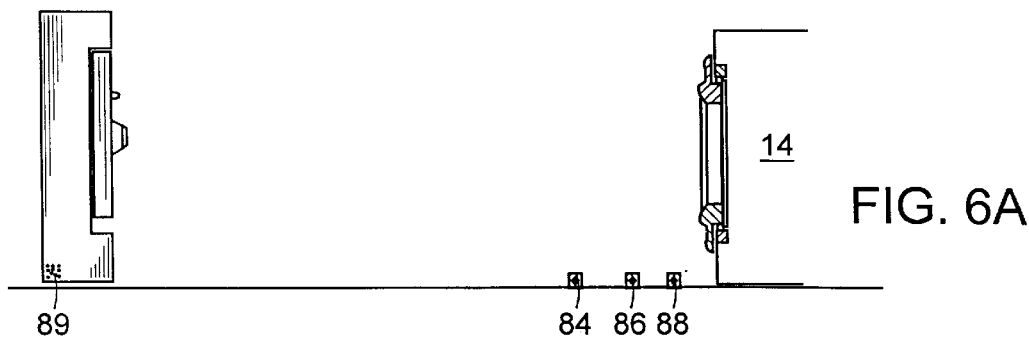
FIG. 6A is a schematic view of a first carriage position of the scanner of FIG. 1.

FIG. 6A shows the "carriage open" position. In this position, the separation mechanism 74 (shown in FIG. 4) is holding the headstock and tailstock sections of the carriage 18 apart against the bias of springs 26. This position is the maximum desired separation between the headstock 12 and tailstock 14, and allows easy loading of a drum into the scanner. Referring again to FIG. 6A, all three of the photosensors 84, 86, 88 are unobstructed by the tailstock flag in this position, and their output signals are all in the same, first output state.

Figure 6B:
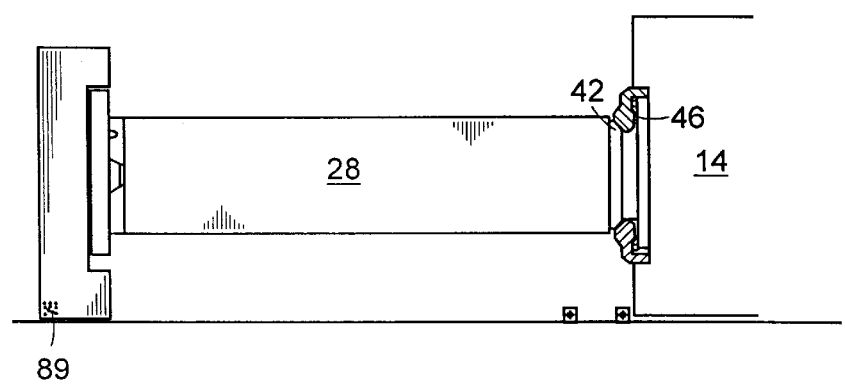
FIG. 6B is a schematic view of a second carriage position of the scanner of FIG. 1.

When the 4" drum 28 is loaded into the scanner, the lever 76 (FIG. 4) is moved to allow the force of springs 26 to draw the headstock and tailstock toward each other. The separation between the two halves of the carriage 18 is then defined by the length of the drum 28, and the contact between the drum right side 42 and the tapered surface 46 of tailstock 14. As shown in FIG. 6B, the 4" drum 28 holds the headstock and tailstock separated at a distance which results in photosensor 88 being obstructed by the surface of tailstock 14, but prevents the obstruction of the other photosensors 84, 86. Thus, the output of photosensor 88 is in a second state, while the output of the photosensors 84, 86 remain in a first state. This combination of photosensor output signals thus indicates that the 4" drum 28 is mounted on the scanner 10.

Figure 6C:
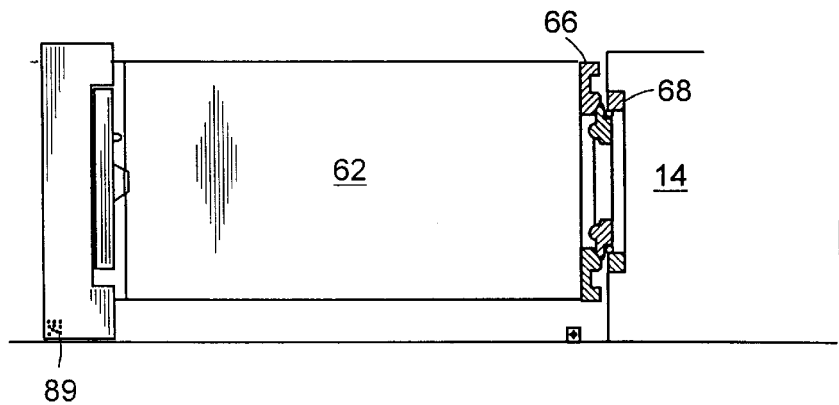
FIG. 6C is a schematic view of a third carriage position of the scanner of FIG. 1.

If, instead, the 8" drum 62 is loaded into the scanner 10, the presence of the drum and the seating between the drum right side 66 and tapered surface 68 of the tailstock 14 result in a different relative separation between the headstock 12 and tailstock 14 than that when the 4" drum is in place. As shown in FIG. 6C, the tailstock and headstock are closer together than when the 4" drum is mounted. With the 8" drum 62 in place, the tailstock 14 now obstructs both photosensor 88 and photosensor 86. In this position, the outputs of photosensors 86, 88 are both in a second state, while the output of photosensor 84 remains in a first state. Thus, this combination of signals indicates that the 8" drum 62 is mounted on the scanner 10.

While it is not strictly required that the drums be of equal length, in the preferred embodiment the 4" drum and the 8" drum are of equal length. This provides ease of manufacture and packaging. The difference in the separation between the headstock and the tailstock for the 4" drum and the 8" drum is due to the contact between each drum and the different tapered surfaces of the tailstock.

Figure 6D:
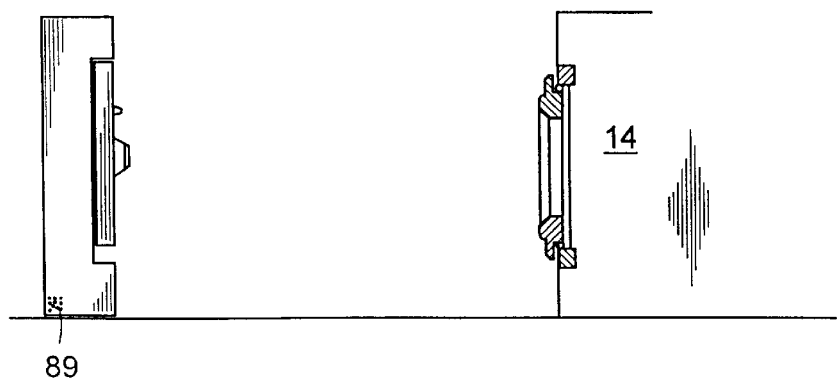
FIG. 6D is a schematic view of a fourth carriage position of the scanner of FIG. 1.

FIG. 6D shows the relative position of headstock 12 and tailstock 14 when no drum is mounted on the scanner, and when the lever 76 (FIG. 4) is moved to allow the springs 26 to draw the headstock and tailstock toward each other. With no drum to hold the tailstock and headstock apart, they contact each other, and their relative separation is at a minimum. As shown in FIG. 6D, this situation results in each of the three photosensors 84, 86, 88 being obstructed by the flag of the tailstock 14 and, thus, each of the photosensor output signals is in a second state. This combination of output signals is therefore indicative of the "carriage closed" condition (i.e. when no drum is loaded, but the engaging mechanism of FIG. 4 does not hold the tailstock and headstock apart).

Scanning Head and Transmittance Illuminator Positioning

One advantage provided by the photosensors 84, 86, 88 will become apparent with the following description of the optical components of the scanner. To allow scanning in the transmittance mode, a light source must be located to the inside of the drum during scanning. This light source shines toward the transparent surface of the drum and illuminates the image being scanned, which is depicted on a transparency mounted on an outer surface of the drum. This light is then collected by a scanning head on the outside of the drum.

In the present invention, the transmittance illuminator is held by center arm 90, which is stationary relative to the body of the scanner, but preferably centered about a rotational axis of the scanner 10. Thus, if a drum is mounted on the scanner the center arm 90 will be within the drum during scanning as the drum moves to the right and more completely surrounds the arm. The center arm 90 (as clearly shown in FIGS. 1, 2A, 2B) extends from the right side of the scanner, covering approximately half the length of the scanning area. When the carriage 18 is in the home position (i.e. at its furthest left point of travel), the left side of the carriage is to the left of the left side of the center arm 90. This is true even when the carriage is in the carriage open position. Thus, in this position, a drum may be loaded into the scanner without interference from the center arm 90.

Once a drum is loaded and the scanning cycle begins, the carriage moves to the right until the center arm is within the body of the drum. The tailstock 14 has a hole wide enough to accept the center arm, and the carriage progresses to the right with the transmittance illuminator pointed at the surface of the drum. This continues until the entire surface of the drum has been scanned.

While the center arm 90 is small enough to fit within either the 4" drum 28 or the 8" drum 62, the position of the transmittance illuminator and the scanning head must be adjusted to allow proper focusing on the surfaces of the two different drums. That is, when the 4" drum is mounted, the surface being illuminated is much closer to the center arm than when the 8" drum is mounted. This adjustment is accomplished as follows.

FIG. 7 is a side view which includes center arm 90, upon which is mounted pinion gear 92 and guide support 94. Meshing with pinion gear 92 is rack 96 to which is attached a guide 98 that supports fiber optic bundle 100. The fiber bundle 100 is rigidly connected to the guide, and therefore moves with it. In the preferred embodiment, the fiber bundle points toward the rear of the scanner (i.e. to the left in the figure).

The surface of the center arm 90 is shown cut away to reveal certain elements which are preferably contained within it. A small DC motor 102 located within the center arm 90 is attached to the pinion 92, and is controllable to turn the pinion. The turning of the pinion 92 results in the lateral movement of the rack 96. A light source 104 may also be mounted within center arm 90, on the side of it, or at a more remote location. The light source need only be optically coupled to fiber bundle 100 to introduce the necessary light thereto. When light is coupled into the fiber bundle, it is subsequently emitted from the far end of the fiber bundle 100 toward the surface of the drum to illuminate any image on the drum.

FIG. 7A is a cross section of fiber bundle 100 of the transmittance illuminator. The fiber bundle 100 consists of a plurality of optical fibers 114, each of which conduct. light from light source 104. No lens is used with the bundle, the fibers shining their light directly toward the drum surface. In effect, the fiber bundle is a plurality of closely-positioned light sources which illuminate the desired portion of the drum surface. This provides for a uniform illumination of the surface, and removes the need for a diffuser. It also reduces the effect of slight misalignments in the fiber bundle 100 which may occur over the course of time.

Another rack and pinion arrangement (also shown in FIG. 7) is located behind the rack 96 and pinion 92 of the center arm 90. Like pinion 92, pinion 106 is driven by a small DC motor 107 which is rigidly fixed relative to the back inside surface of the scanner 10. The pinion 106 meshes with rack 108, to which is mounted scanning head 110. Scanning head 110 is shown in more detail in the isometric, partially exploded view of FIG. 7B. As shown, the scanning head consists of an objective lens 111, which is surrounded by four optical fiber bundles 113 which, along with a remote light source 115 (shown schematically), make up the reflectance illuminator. The positions of the fiber bundles 113 are such that the light they project converges at the expected location of a drum surface being scanned (i.e. at the focal point of objective lens 111).

Light source 115 is preferably mounted at a remote location outside of the scanning head 110. The light from this light source 115 is optically coupled into one large fiber bundle which is split off into the fiber bundles 113 to provide the desired light for illuminating the drum surface. As with the transmittance illuminator, the flexibility of the optical fiber bundle allows the scanning head to move relative to light source 115 without disrupting coupling of light to the end of the fiber bundle.

Figure 7B:
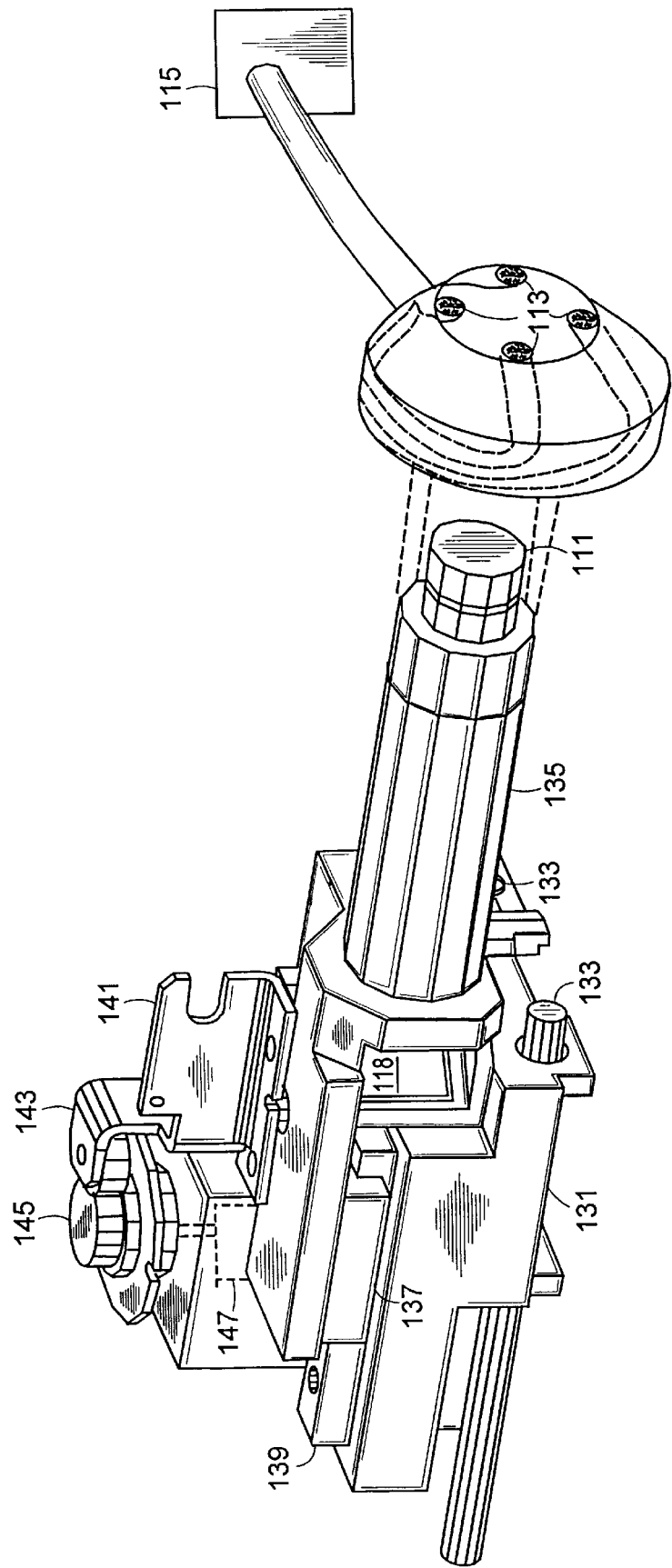
FIG. 7B is an isometric, partially exploded view of the scanning head of FIG. 7.

The manner of adjusting and focusing the scanning head 110 may be described with reference to FIG. 7B. A shuttle 131 is mounted on two parallel support rods 133 (one of which is partially obscured in the figure). The shuttle is mounted to rack 108 (shown in FIG. 7) which may be moved by pinion 106 to move the shuttle 131 as guided by the support rods 133.

Objective lens 111, along with the emitting ends of fiber bundles 113, are positioned at the end of an extender tube 135 which extends outward from shuttle 131. The extender tube assembly is connected to the shuttle by a slide mechanism, which in the preferred embodiment is a dovetail slide 137, which is slidably restricted to dovetail guide 139. The dovetail slide 137 is connected to follower mount 141, which supports cam follower 143. The dovetail slide is also spring-biased (relative to the shuttle 131) toward the rear of the shuttle 131. This bias keeps the cam follower 143 in firm contact with cam 145, which may be rotated by cam motor 147.

Cam motor 147, and therefore cam 145, are fixed in position relative to the shuttle 131. When the cam 145 is rotated by the cam motor, the position of the cam follower 143 is changed relative to a rotational axis of the cam and, consequently, the position of the dovetail slide (and the extender tube) changes relative to the shuttle 131. Because scanning head mirror 118 is fixed in position relative to the shuttle 131, this positional shift changes the distance between the objective lens 110 and the detection optics in the optics box which receive the light from the objective lens. As such, the focus of the lens is also changed. Thus, focusing of the lens 111 may be accomplished by rotating cam 145 with cam motor 147.

Although moving the shuttle 131 and the scanning head mirror together also changes the focus of the lens 111, the movement of the mirror 118 relative to the detection optics causes a displacement of the focused light relative to a detection aperture of the optics, and pixel errors result. Thus, focusing as described above is preferred, using remote control of the cam motor 147. The cam motor 147 is controlled with an output from controller 112 (FIG. 7), which detects the focus of the lens and determines an appropriate compensation by conventional means.

With the reflectance illuminator, it is particularly important to attempt to reduce stray light from reaching a detection aperture of the optics box due to unwanted reflections. Such reflections are particularly problematic during calibration of the scanner. Calibration for reflectance scanning involves rotating the drum, and focusing on an opaque surface (a white reference) and the transparent surface of the drum (a black reference). Because the ideal black reference is to have no light at all returning from the light source to the detection aperture of the optics box, it is desirable to keep reflection from the drum surface at a minimum. However, some finite amount of reflection is unavoidable and, in fact, since the drum has a finite thickness, there are actually two surfaces from which light from the reflectance light source is reflected.

In the preferred embodiment the fiber bundles are relatively close to the objective lens of the scanning head. This provides a relatively large amount of reflection to the scanning head from an image being illuminated, and provides a strong optical signal, which improves the signal-to-noise ratio of the scanner. However, this angle of illumination also results in a greater amount of reflection from the drum surfaces. While an illumination angle which is farther from a normal axis to the drum reduces the amount of unwanted reflection during calibration, it also reduces the amount of desired light which is reflected from an opaque document containing an image to be scanned.

To compensate for the increased potential for reflection off the drum during calibration, the preferred embodiment uses optical fibers having a core and cladding specifically selected to give the fiber a low numerical aperture. (The numerical aperture of a fiber is equal to the sine of one half of the angle at which light emanates from the fiber). The low numerical aperture of the fiber results in a decrease in the deviation of the light emitted from an optical axis of the bundle. That is, the conical projection of light from each fiber bundle has a smaller change in radius over unit distance. As such, light impinging on the surface of the drum consists of a directional component closer to a normal axis to the surface of the cylinder, and unwanted specular reflections do not reach the detection aperture of the optics box.

The drum surface partially shown in FIG. 7 is that off the 8" drum 62. To accommodate this larger drum, the pinion gears 92 and 106 are rotated so that rack 96 and rack 108 are positioned as far back in the scanner as possible. That is, because the surface of the 8" drum is farther from the center arm 90 than the surface of the 4" drum, the rack 96 (and consequently the end of the transmittance illuminator) is moved toward the back of the scanner to position the end of its fiber bundle adjacent to the surface of the drum 62. Similarly, pinion 106 is rotated to move rack 108 back as far as possible so as to move it out of the way of the drum surface. In this position, the lens 110 is positioned adjacent the surface of the drum 62 facing the end of the fiber bundle 100.

When the 4" drum 28 is loaded onto the scanner 10, the positions of the racks 96 and 108 shown in FIG. 7 are unacceptable for scanning purposes, since the fiber bundle 100 would be in the way of the outer surface of the drum 28, and rack 108 would position the scanning head 110 too far away from the drum surface. Therefore, the pinion gears 92 and 106 are rotated so as to move the racks 96, 108 to their frontmost position (i.e. the farthest to the right in FIG. 7). When the rack 96 is moved to this position, the fiber bundle 100 (which is flexible) bends and, due to the rigid coupling of the fiber end and rack, causes the fiber bundle to remain fixed relative to the position of the rack 96.

In the frontmost position, the end of the fiber bundle 100 is positioned to be adjacent to the surface of the 4" drum during scanning. Similarly, the movement of rack 108 to its frontmost position results in the scanning head also being located adjacent to the surface of the 4" drum, opposite the end of the fiber bundle 100. In fact, in the preferred embodiment, the location of the output end of the fiber bundle 100 and the scanning head 110 relative to the surface of the 4" drum when the racks 96, 108 are in the frontmost position is approximately the same as the location of the output end of the fiber bundle 100 and the scanning head relative to the surface of the 8" drum when the racks 96, 108 are in the rearmost position.

Power to the two motors 102, 107 is controlled by controller 112 which, in the preferred embodiment, is a microprocessor and is shown schematically in FIG. 7. The controller 112 receives the output signals from photosensors 84, 86, 88, 89, and therefore can respond to the detection of the home position of the carriage and the relative separation of the headstock and tailstock (as indicated by the carriage photosensor output signals). This enables the controller 112 to ensure that fiber bundle 100 and scanning head 110 are positioned correctly for the particular drum being loaded onto the scanner. The controller also controls the switching of power to the drive motor 16 and the screw drive, and supervises the signal acquisition by the optics box, as in conventional scanners.

The present embodiment also includes photosensors 121 and 123, as shown in FIG. 7 and FIG. 7A. Photosensors 121, 123 operate in the same manner as photosensors 84, 86, 88, 89 in that they each have their optical signal interrupted by a flag. Photosensor 121, rigidly fixed relative to center arm 90, has its optical path interrupted by a perpendicular flag 125 of rack 76 (as shown in FIG. 7A), when the rack 76 is in its frontmost position. Similarly, photosensor 123 has its optical path interrupted by perpendicular flag 127 of rack 108 when rack 108 is in its rearmost position.

The inputs of photosensors 121,123 to the controller 112 provide confirmation of the racks being in a "safe" position. Except during scanning, the controller powers motors 102, 107 as appropriate to move racks 96, 108 to the safe position (where rack 108 is at its rearmost position and rack 96 is at its frontmost position). With the racks in this position, the transmittance illuminator and the scanning head are clear from any accidental interference with a drum mounted on the scanner, regardless of whether it was the 4" or the 8" drum. When scanning is to begin, one of the two racks must be moved depending on which drum is mounted, so the controller provides power of the appropriate polarity to the appropriate one of motors 102, 107 for a predetermined period of time sufficient to move the rack to the other extreme position. A more detailed description of the scanner operation follows.

When the 4" drum 28 is to be used, a user opens the carriage with lever 76 (FIG. 4) and raises support arms 54, 56 (FIG. 2A). (Presumably the solenoid lock on the lid of scanner 10 has already been opened by the controller, which senses the interruption of the photosensor 89 optical path by the headstock flag). The drum 28 is then rested on top of the support arms 54, 56, with the alignment mark of the drum correctly positioned. The lever 76 is then moved back to the second position to allow the carriage to close. The movement of the headstock 12 and tailstock toward each other lifts the drum 28 off the supports, and causes it to be held between them. In this relative position of the headstock 12 and tailstock 14, photosensor 88 has been obstructed by the flag of tailstock 14 (as shown in FIG. 6B) and its output changes relative to that of photosensors 84, 86.

The above combination of photosensor outputs is detected by the controller 112, which accepts it as an indication that the 4" drum 28 is loaded on the scanner 10. In response to this combination of photosensor signals, the controller causes power of a first polarity to be provided to the motor 107. This power causes the pinion 106 to rotate in a first direction which moves the rack 108 toward the front of the scanner (as discussed above). Since, for rack 96, the safe position is also the proper position for illuminating the 4" drum, it is not necessary to power motor 102 to move rack 96. After a minimum amount of time has elapsed (i.e. the minimum necessary to move the rack 108 from the rearmost position to the frontmost position), the power to motor 107 is discontinued by the controller 112. In response to a user input, the controller then controls the various elements of the scanner to begin scanning. After scanning, the controller 112 provides power of a second polarity to motor 107, and the rack 108 is moved back to the safe position.

When the 8" drum 62 is to be used on the scanner, the carriage 18 (in the home position) is opened (FIG. 4), and the support arms 54, 56 are folded down (FIG. 2B). The 8" drum 62 is then placed onto the support arms and the lever 76 is moved back to the second position (FIG. 4) to allow the spring-biased motion of the headstock 12 and tailstock 14 toward each other. This results in the 8" drum 62 being lifted off of the support arms 54, 56, and held in the scanning position by the headstock 12 and tailstock 14. In this position, photosensors 86 and 88 are obstructed by the flag of tailstock 14 (as shown in FIG. 6C), and their outputs change relative to that of photosensor 84.

The above combination of photosensor outputs is detected by the controller 112 which interprets it as indicating that the 8" drum is mounted in the scanner. In response to this, the controller causes power of a second polarity to be provided to motor 102 which results in pinion 92 rotating in a second direction. This, in turn, moves the rack 96 toward the rear of the scanner. This application of power continues for a minimum amount of time (equal to the minimum time necessary to move the rack from its frontmost position to its rearmost position), before the power to motor 102 is discontinued. Again, since the safe position for rack 108 is also the proper position for scanning the 8" drum, it is not necessary to power motor 107 to move rack 108. As with the 4" drum, the controller 112 then initiates the scanning process in response to a user input.

Light Acquisition and Detection

As mentioned, the scanning head 110 shown in FIG. 7 must be maintained at a specific distance from the surface of each drum to ensure proper focusing. One way of accomplishing this is to move the entire optics box 116 with the scanning head. However, it is inconvenient to do so, and the present invention instead moves only the scanning head 110, and adjusts within the optics box to compensate.

Figure 8A:
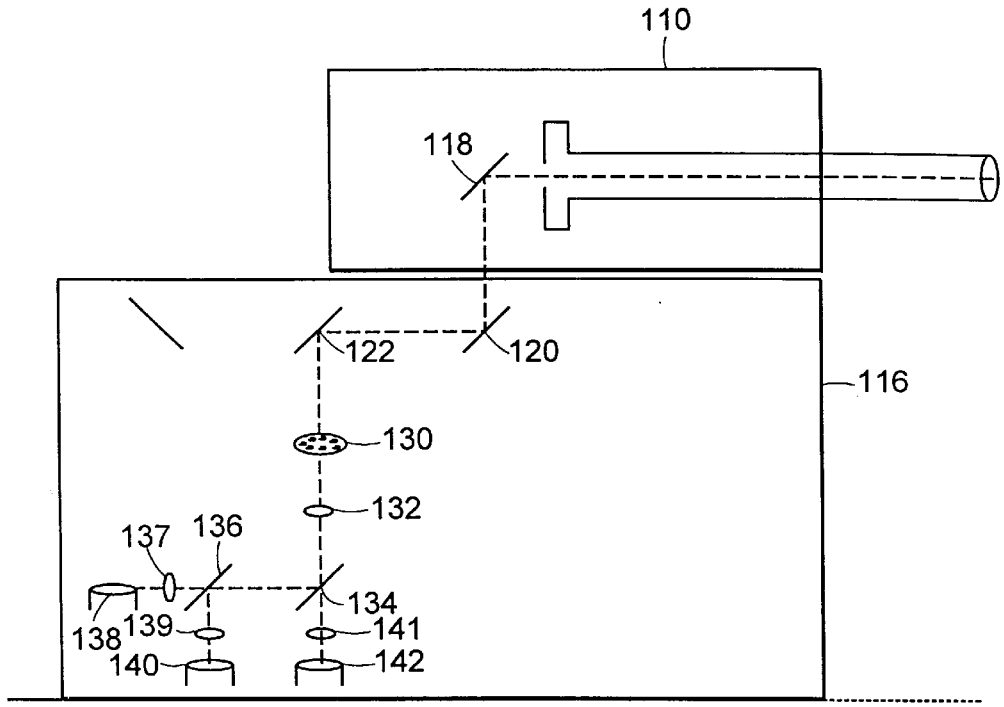
FIG. 8A is a schematic view of an optics box of the scanner of FIG. 1 with the scanning head in a first position.

Schematically shown in FIG. 8A is optics box 116 of the preferred embodiment which has an aperture wheel 130, a focusing element 132, beamsplitters 134, 136 and color filters 137, 139, 141 as is known in the art. The aperture wheel may be positioned to provide the desired aperture for the scan being conducted, thus supplying a desired field stop. The beamsplitters 134, 136 receive light transmitted through the aperture, and break it down into three separate beams. These beams are then passed through color filters 137, 139, 141, which each allow passage of a different color band, prior to each beam reaching a different one of photomultiplier tubes 138, 140, 142

The scanning head 110 is in its frontmost position relative to the front of the scanner 10. That is, it is in the position necessary for the scanning of the 4" drum 28. The optical path of the light collected by the scanning head in this position is indicated by the broken line in the figure. As can be seen, the light, enters through a lens of the scanning head 110 and is reflected by a scanning head mirror 118. In this first position, the light from the scanning head mirror is reflected to a first stationary mirror 120, which in turn reflects it to movable mirror 122. The movable mirror 122 then reflects the light from stationary mirror 120 at a 90° angle to the remaining optics of the scanner.

Unlike conventional scanners, the scanning head 110 of the present invention is attached to the optics box by a slide mechanism 128 which allows the scanning head 110 to move laterally relative to the optical elements of the optics box 116. In the preferred embodiment, the scanning head 110 is rigidly connected to rack 108 (FIG. 7) and moves with it as a result of the rotation of pinion 106.

Figure 8B:
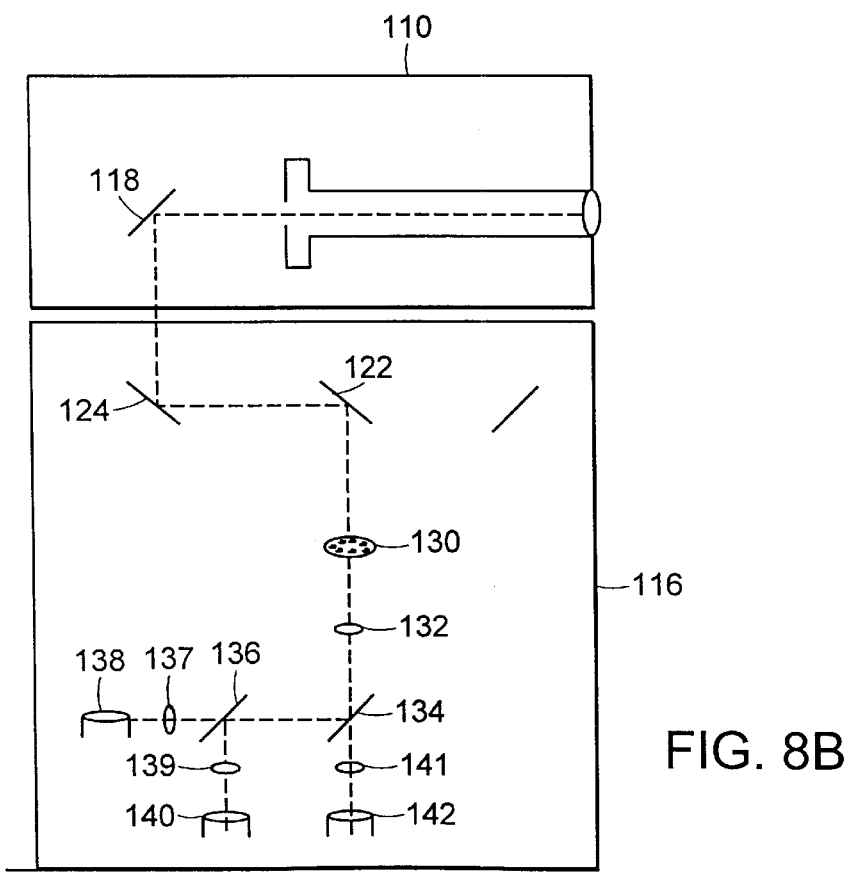
FIG. 8B is a schematic view of an optics box of the scanner of FIG. 1 with the scanning head in a second position.

When the scanning head 110 moves to the second position to accommodate the 8" drum, the movement causes movable mirror 122 to pivot 90° about an axis perpendicular to the plane in which light is being reflected by the other mirrors. The manner in which this pivoting is accomplished is discussed below. The scanning head 110 moves until it reaches the position for scanning the 8" drum. That position is shown schematically in FIG. 8B.

In the 8" position of the scanning head, scanning head mirror 118 no longer reflects light toward stationary mirror 120. Instead, scanning head mirror 118 is aligned to reflect the light toward stationary mirror 124, which in turn reflects it to movable mirror 122. Because movable mirror 122 is now angled 90° relative to its previous orientation, it is again aligned to reflect the light it receives toward the optical components of optics box 116. In the preferred embodiment, the optical distance between scanning head mirror 118 and movable mirror 122 in the first scanning head position is the same as the optical distance between scanning head mirror 118 and movable mirror 122 in the second position. This minimizes any relative focal changes between the two signals due to the different optical paths.

Figure 9:
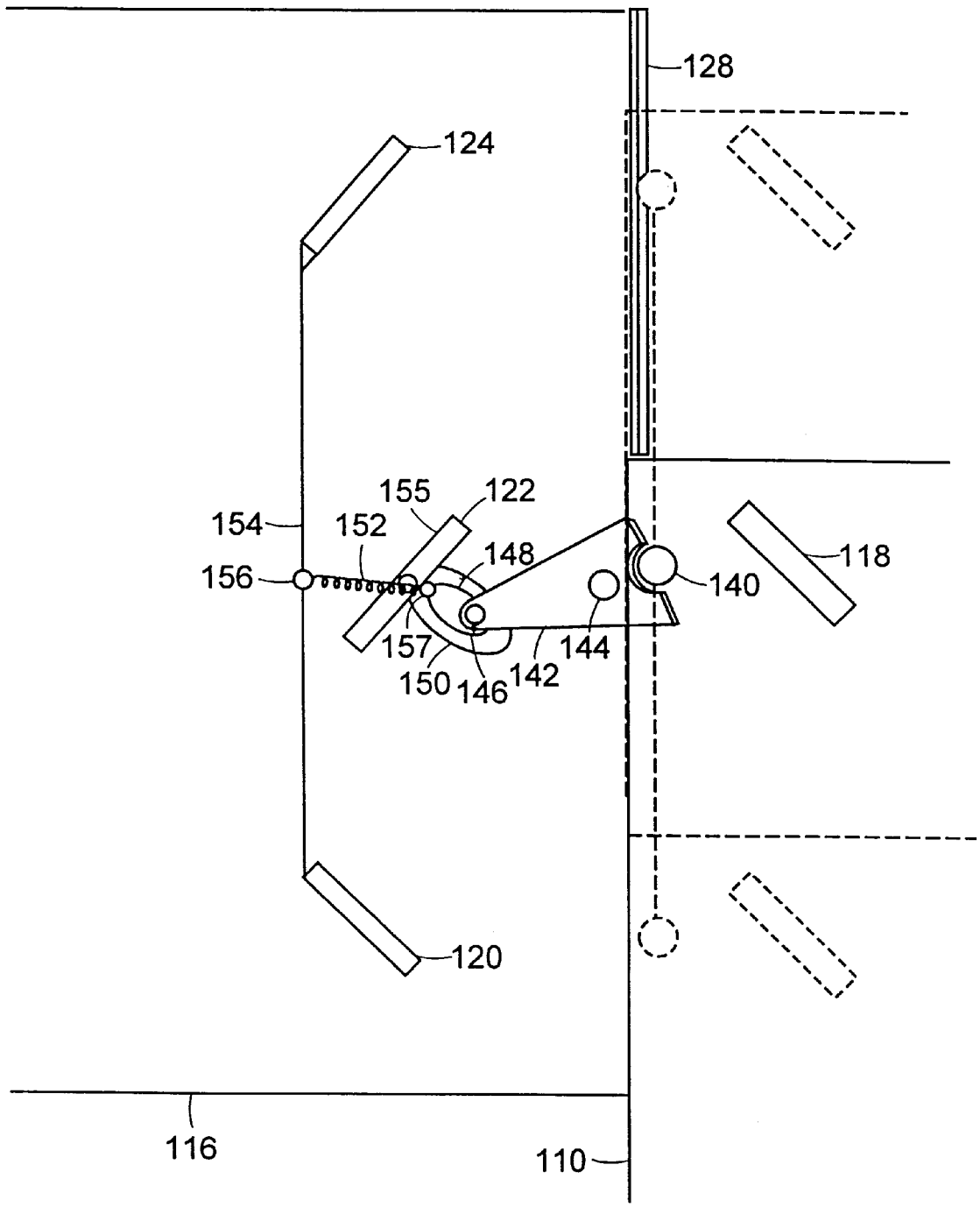
FIG. 9 is an isolated, cross sectional top view of a part of the optics box of FIG. 7.

The control of movable mirror 122 may be described in conjunction with FIG. 9. Shown in the figure is the sliding connection 128 between the optics box 116 and scanning head 110. Rigidly affixed to the scanning head 110 is an actuator pin 140 which moves along a linear path as the position of the scanning head is changed. At a midpoint along this linear path, the pin makes contact with a cavity of an actuator bracket 142, which is attached to the optics box 116, but free to pivot about pivot pin 144.

A guide pin 146 of the actuator bracket 142 resides in a guide slot 148 of mirror guide 150, which is rigidly affixed to the rear of movable mirror 122. The mirror guide 150 is also connected to retaining spring 152, the other side of which is attached to a fixed mirror support 154 of the optics box 116. (The connection of spring 152 to mirror guide 150 is by way of a raised connection post 157 which is elevated above the rest of the mirror guide 150). The movable mirror 122 is pivotable about pivot point 155, which is preferably secured to a housing of the optics box below the mirror, and to a pivot support above the mirror 122. (It should be noted that if the mirror is secured by a pivot support above it, the pivot support must be lower than the spring 152 to avoid interfering with the pivoting action of the movable mirror 122).

The retaining spring 152 is under extension between the mirror guide 150 and the fixed mirror support 154, and therefore biases the connection post 157 away from a center line between the mirror pivot point 155 and the point 156 at which the retaining spring 152 connects to mirror support 154. Under this bias, the mirror guide 150 (as well as the actuator bracket 142) pivots away from the center line until the guide pin 146 reaches the end of guide slot 148, at which point the actuator bracket is prevented from pivoting any further. Consequently, the movable mirror 122, which is fixed to the mirror guide 150, also pivots.

The spring-biased arrangement of FIG. 9 results in the mirror 122 (and hence the actuator bracket 142) residing in one of two different positions. The two positions of movable mirror 122 correspond to those positions demonstrated by FIGS. 8A and 8B, respectively. The toggling of the mirror between these two positions is caused by contact between actuator pin 140 and actuator bracket 142. As the scanning head is moved from the 8" position to the 4" position along the slidable connection 128, actuator pin engages the cavity of actuator bracket 142, causing the bracket to pivot against the mirror guide 150 and against the bias of retaining spring 152. The guide pin continues along its linear path, moving the actuator bracket 142 until the connection post 157 of mirror guide 150 crosses the center line between mirror pivot point 155 and connection point 156, at which time the bias of retaining spring 152 snaps the mirror 122, and the actuator bracket 142, into the new position. When the scanning head is moved back to the 8" position, the same action occurs in the opposite direction. The two stationary positions of the scanning head are demonstrated by the broken lines of FIG. 9. The solid lines show scanning head midway between the 4" position and the 8" position to demonstrate the engagement between actuator pin 140 and actuator bracket 142.

The terms and expressions employed herein are terms of description and not of limitation. In the use of such terms and expressions, there is no intention of excluding any equivalents of the features shown and described. It is recognized that various modifications are possible within the scope of the invention claimed. In addition, other modifications and changes will be apparent to those skilled in the art. Such changes and modifications are intended to be within the scope of the appended claims.

For example, the features of the present invention are clearly modifiable to extend the capacity of the scanner beyond just two drums. It is considered well within the scope of the invention to use equivalent arrangements to create a scanner which supports three or more drums of different diameter. Furthermore, the different features which are designed to support the two drums (i.e. the dual position scanning head/transmittance illuminator, the two-optical path optics box, the two level support arms, etc.,) can all be adapted to service however many drums are desired without exceeding the scope of the present invention.

What is claimed is:

1. A rotary image scanner comprising:

a headstock for contacting and supporting a first side of a selected one of a first and second rotatable drums;

a tailstock which contacts and supports a second side of said selected drum, the tailstock having a first substantially annular surface of a first diameter sized to make contact with a surface of said selected drum when said selected drum is the first drum and a second substantially annular surface of a second diameter sized to make contact with a surface of said selected drum when said selected drum is the second drum;

a drive motor for providing rotational force to rotate said selected drum mounted in the scanner between the headstock and tailstock;

a light source for illuminating the surface of said selected drum; and a scanning head for receiving light from the surface of said selected drum.

2. A rotary image scanner according to claim 1 wherein the first substantially annular surface of the tailstock is a tapered surface.

3. A rotary image scanner according to claim 2 wherein said annular surface of the first drum forms substantially a spherical surface segment.

4. A rotary image scanner according to claim 2 wherein said first substantially annular surface is tapered such that its diameter decreases away from said selected drum.

5. A rotary image scanner according to claim 2 wherein the second substantially annular surface of the tailstock forms substantially a spherical surface segment.

6. A rotary image scanner according to claim 5 wherein said surface of the second drum is a tapered surface.

7. A rotary image scanner according to claim 2 wherein said surface of the second drum is tapered such that its diameter increases away from a cylindrical portion of the drum.

8. A rotary image scanner according to claim 1 further comprising a support arm for supporting said selected drum, the support arm being adjustable between a first position in which it supports the first drum when selected as said selected drum with its rotational axis slightly below a rotational axis of the headstock and tailstock, and a second position in which said support arm supports the second drum when selected as said selected drum with its rotational axis in a position slightly below said rotational axis of the headstock and tailstock.

9. A rotary image scanner according to claim 8 wherein the support arm has a pivoting connection by which it may be moved between the first position and the second position.

10. A rotary image scanner according to claim 8 wherein the support arm is a first support arm and wherein the scanner comprises a plurality of additional support arms which work in concert to support said selected drum.

11. A rotary image scanner according to claim 1 further comprising a separation mechanism for changing the relative separation between the headstock and the tailstock.

12. A rotary image scanner according to claim 11 further comprising an elastic element which biases the headstock and tailstock toward each other, the elastic element operating in conjunction with said separation mechanism such that in an open setting of said separation mechanism the headstock and tailstock are separated by a distance greater than the length of any drum to be mounted in the scanner and in a closed setting of said mechanism, the headstock and tailstock are drawn toward each other under the bias of the elastic element.

13. A rotary image scanner according to claim 1 wherein a separation between the headstock and tailstock is larger when the first drum is held between them than when the second drum is held between them.

14. A rotary image scanner according to claim 13 further comprising an optical positioning device which adjusts the distance of the scanning head from a rotational axis of the scanner, said device comprising:
a carriage sensing device which detects the relative separation between the headstock and the tailstock and outputs a carriage position signal indicative thereof;
a scanning head adjustor which responds to an adjustment signal to change the position of the scanning head; and
a controller which receives the carriage position signal and outputs the adjustment signal in response thereto.

15. A rotary image scanner according to claim 14 further comprising:
an optics box which houses a plurality of color filters and light detectors and which receives light from the scanning head; and
a slide mechanism connecting the scanning head to the optics box, the slide mechanism having a plurality of slide positions, its position changing as the position of the scanning head is adjusted by the scanning head adjuster.

16. A rotary image scanner according to claim 15 wherein, in a first position of the slide mechanism, light is directed into the optics box by the scanning head along a first optical path and in a second position of the slide mechanism, light is directed into the optics box by the scanning head along a second optical path.

17. A rotary image scanner according to claim 16 wherein light directed along said first optical path is reflected off of a first stationary mirror of the optics box to a movable mirror of the optics box, which redirects the light along an input optical path of the optics box and wherein, when the slide mechanism is moved to the second position, the angular orientation of the movable mirror is changed and light directed along said second optical path is reflected off of a second stationary mirror of the optics box to said movable mirror which redirects it along said input optical path.

18. A rotary image scanner according to claim 17 wherein the movable mirror is a pivotable mirror which pivots about an axis perpendicular to the input optical path.

19. A rotary image scanner according to claim 14 wherein the first drum and the second drum each comprise a transparent surface and the light source comprises a transmittance illuminator which, during scanning, resides within a drum mounted on the scanner, and wherein the optical positioning device further comprises an illuminator adjustor which responds to the adjustment signal to change the position of the transmittance illuminator relative to a rotational axis of the scanner.

20. A rotary image scanner according to claim 19 wherein the transmittance illuminator comprises a fiber optic bundle which illuminates a surface of the drum directly without the light it emits being altered prior to said illumination.

21. A rotary image scanner according to claim 14 wherein the carriage sensing device comprises a plurality of photosensors which detect the relative separation between said headstock and said tailstock.

22. A rotary image scanner comprising:
a drum carriage comprising a headstock and a tailstock for supporting one of a plurality of drums of different diameters, the carriage being such that the relative separation between the headstock and tailstock is different depending on which drum is mounted in the scanner;
a position sensor for detecting the relative separation between the headstock and tailstock and for generating a carriage position signal indicative thereof;
a light source for illuminating a surface of a drum mounted in the scanner;
a scanning head for receiving light from the surface of a drum mounted in the scanner;
a scanning head adjustor which responds to an adjustment signal to change the position of the scanning head relative to a rotational axis of the scanner; and
a controller for receiving the carriage position signal and generating the adjustment signal in response thereto.

23. A rotary image scanner according to claim 22 wherein the light source is a transmittance illuminator which is located within the drum during scanning, and wherein the scanner further comprises an illuminator adjustor which responds to said adjustment signal to change the position of the transmittance illuminator relative to a rotational axis of the scanner.

24. A rotary image scanner according to claim 23 wherein the transmittance illuminator comprises an optical fiber bundle.

25. A rotary image scanner according to claim 22 further comprising:
an optics box which houses a plurality of color filters and light detectors and which receives light from the scanning head; and
a slide mechanism connecting the scanning head to the optics box, the slide mechanism having a plurality of lateral positions which change as the position of the scanning head is adjusted by the scanning head adjustor.

26. A rotary image scanner according to claim 25 wherein, in each of a plurality of different positions of the slide mechanism, light is directed into the optics box by the scanning head along one of a plurality of different optical paths.

27. A rotary image scanner according to claim 26 wherein light directed along a first of said optical paths is reflected off of a first stationary mirror of the optics box to a movable mirror of the optics box, which redirects the light along an input optical path of the optics box and, wherein, when the slide mechanism is moved to a second of said positions, the angular orientation of the movable mirror is changed and light directed along a second of said optical paths is reflected off of a second stationary mirror of the optics box to said movable mirror which redirects it along said input optical path.

28. A rotary image scanner according to claim 27 wherein the movable mirror is a pivotable mirror which pivots about an axis perpendicular to the input optical path.

29. A rotary image scanner according to claim 22 wherein the scanning head adjustor comprises a rack and pinion.

30. A rotary image scanner comprising:
- a drum carriage comprising a headstock and a tailstock for supporting one of a plurality of drums of different diameters;
- a light source for illuminating a surface of a drum mounted in the scanner;
- a scanning head for receiving light from the surface of a drum mounted in the scanner, and directing the light received in a first direction relative to the scanning head;
- an optics box for receiving light from the scanning head and converting it to a scanning signal, the position of the scanning head being adjustable relative to the optics box such that said light directed from the scanning head travels along any one of a plurality of optical paths; and
- means for directing light from the scanning head along an input optical path of the optics box, said means comprising a movable mirror having a plurality of different positions for receiving light along a plurality of different optical paths and which, in a first of said positions receives light along a first of said optical paths from the scanning head and redirects it along said input optical path and, in a second of said positions, receives light along a second of said optical paths from the scanning head and redirects it along said input optical path.

31. A rotary image scanner according to claim 30 wherein said movable mirror comprises a pivotable mirror which pivots about an axis between different angular orientations.

32. A rotary image scanner according to claim 31 wherein said pivotable mirror is subject to the bias of an elastic element which retains it in one of said angular orientations.

33. A rotary image scanner according to claim 32 further comprising an actuator which responds to movement of the scanning head relative to the optics box such that when the scanning head moves from a first of said positions to a second of said positions, said actuator causes pivoting of the pivotable mirror from a first of said angular orientations to a second of said angular orientations.

34. A rotary image scanner according to claim 33 wherein said actuator comprises an actuator pin which is fixed in position relative to the scanning head, and an actuator bracket which is pivotably connected to the optics box.

35. A rotary image scanner according to claim 30 wherein said means for redirecting light from the scanning head is such that each of said optical paths is substantially equal in length.

36. A rotary image scanner comprising:
- a rotatable drum upon which an image to be scanned is mounted;
- a drum carriage comprising a headstock and a tailstock for supporting the drum in the scanner;
- a scanning head for receiving light from the surface of a drum mounted in the scanner; and
- a light source adjacent to the scanning head for illuminating a surface of the drum, the light source comprising an optical fiber bundle directed substantially toward a focal point of the scanning head, said bundle comprising optical fibers each of which has a numerical aperture selected with regard to a reflectance angle formed by the light source, a detection access of the scanning head, and a surface of the drum, said numerical aperture being sufficiently low such that substantially no specularly reflected light from said fiber bundle travels along said reflectance angle.

37. A rotary image scanner according to claim 36 further comprising an optics box having an aperture to which light from the scanning head is reflected and wherein said numerical aperture of the optical fibers of the fiber bundle is selected to reduce the reflection of light from the fiber bundle by the drum from reaching said aperture of the optics box.

38. A rotary image scanner comprising:
- a rotatable drum upon which an image to be scanned may be mounted, said drum having a first mounting surface at a first end of the drum which varies in diameter along a direction parallel to a longitudinal axis of the drum and a second mounting surface at a second end of the drum opposite the first end which varies in diameter along a direction parallel to a longitudinal axis of the drum;
- a headstock for contacting and supporting the first end of the drum, the headstock having a surface which varies in diameter in a direction parallel to a longitudinal axis of the drum;
- a tailstock for contacting and supporting the second end of the drum, the tailstock having a surface which varies in diameter in a direction parallel to a longitudinal axis of the drum;
- a drum support which supports the drum when it is loaded into the scanner, the support holding the drum between the tailstock and the headstock below the normal scanning position of the drum; and
- a carriage closing mechanism which causes the relative separation between the headstock and tailstock to decrease while the drum is supported by the drum support, said separation decrease causing said headstock surface to contact the first mounting surface of the drum and said tailstock surface to contact the second tapered mounting surface of the drum and lift the drum off of the drum support and into a scanning position.

39. A rotary image scanner according to claim 38 wherein said tailstock surface is a substantially annular, tapered surface.

40. A rotary image scanner according to claim 39 wherein the second mounting surface of the drum approximates a spherical segment.

41. A rotary image scanner according to claim 40 wherein the tailstock comprises a second substantially annular surface having a diameter which changes along a direction parallel to a longitudinal axis of the drum, and wherein the drum is a first rotatable drum and the scanner further comprises a second rotatable drum having a different diameter than the first diameter drum, the second drum having a first mounting surface at a first end and a second mounting surface at a second end, said second mounting surface of the second drum being sized to make contact with the second substantially annular surface of the tailstock when the second drum is mounted on the scanner.

42. A rotary image scanner according to claim 41 wherein the height at which the drum support supports a drum in the scanner may be modified to accommodate the different diameters of the drums.

43. A rotary image scanner according to claim 38 wherein the drum support comprises a plurality of support arms, each of which cradles a curved surface of the drum.

44. A rotary image scanner according to claim 38 wherein said surface of the headstock comprises part of a mounting stud which is concentric with a rotational axis of the scanner.

45. A rotary image scanner according to claim 38 wherein the headstock further comprises a drive pawl and the drum further comprises a drive opening which engages the drive pawl, the drive opening being formed by a fixed stop and a movable stop between which the drive pawl may reside, the movable stop being elastically biased to allow expansion of the opening while the drum is being mounted on the scanner.

46. A rotary image scanner comprising:
a transparent, rotatable drum upon which an image to be scanned may be mounted;
a headstock which contacts and supports a first side of said drum;
a tailstock which contacts and supports a second side of the drum;
a scanning head adjacent to a surface of the drum which receives light from the image being scanned; and
a transmittance illuminator which illuminates the drum surface from within the drum, the transmittance illuminator comprising an optical fiber bundle which illuminates the drum surface directly without alteration of light which it emits.

47. A rotary image scanner comprising:
a plurality of rotatable drums each of a different diameter and upon each of which an image to be scanned may be mounted;
a headstock which contacts and supports a first side of a selected drum mounted in the scanner, wherein said selected drum is chosen from said plurality of rotatable drums;
a tailstock which contacts and supports a second side of said selected drum, wherein the mounting of each of said plurality of drums requires a different separation between the headstock and the tailstock;
a scanning head which receives light from said image during scanning;
a drum sensing device which detects which of said plurality of drums is mounted in the scanner and outputs a position signal indicative thereof; and
a scanning head adjuster which is responsive to the position signal and operable to change the position of the scanning head relative to a rotational axis of the scanner so as to accommodate the different diameters of each of said plurality of drums.

48. A rotary image scanner according to claim 46 wherein the drum sensing device comprises a plurality of photosensors each of which has an output which changes when the headstock and the tailstock are at a different relative separation.

49. A rotary image scanner according to claim 47 wherein the scanning head comprises a scanning head mirror and an objective lens which move together during operation of the scanning head adjustor, light from the objective lens being directed to the scanning head mirror, and wherein the scanner further comprises a focusing mechanism for controlling the relative separation between the scanning head mirror and the objective lens.

50. A rotary image scanner according to claim 49 wherein adjustment of the focusing mechanism causes the objective lens to move relative to a rotational axis of the scanner, while the scanning head mirror remains stationary relative to said rotational axis.

51. A rotary image scanner comprising:
a first rotatable drum of a first diameter upon which an image to be scanned may be mounted;
a second rotatable drum of a second diameter upon which an image to be scanned may be mounted;
a headstock which contacts and supports a first side of a drum mounted on the scanner;
a tailstock which contacts and supports a second side of a drum mounted on the scanner, the tailstock having a first substantially annular surface of a first diameter sized to make contact with a corresponding surface of the first drum and a second substantially annular surface of a second diameter sized to make contact with a corresponding surface of the second drum, the supporting of the drums between the headstock and tailstock being such that with the first drum mounted on the scanner the relative separation between the headstock and tailstock is different than the relative separation between the headstock and tailstock when the second drum is mounted on the scanner;
a support arm for supporting a drum being loaded into the scanner, the support arm being adjustable between a first position in which it supports the first drum with its rotational axis slightly below a rotational axis of the headstock and tailstock, and a second position in which it supports the second drum with its rotational axis in a position slightly below said rotational axis of the headstock and tailstock;
a transmittance illuminator for illuminating a transparent surface of a drum mounted on the scanner, the transmittance illuminator residing within the drum during scanning;
a scanning head for receiving light from the surface of a drum mounted on the scanner;
an optics box which houses a plurality of color filters and light detectors and which receives light from the scanning head, the optics box having a movable mirror which receives said light from the scanning head along one of a plurality of optical paths and redirects it along an input optical path;
a slide mechanism which connects the scanning head to the optics box and which changes the angular orientation of the movable mirror when it moves such that, in a first position of the slide mechanism, light from the scanning head is received by the movable mirror along a first optical path and, in a second position of the slide mechanism, light from the scanning head is received by the movable mirror along a second optical path;
an optical positioning device which detects the relative separation of the headstock and tailstock and which adjusts the positions of the scanning head and the transmittance illuminator relative to a rotational axis of the scanner in response to the detected separation; and
a drive motor for providing rotational force to rotate a drum mounted in the scanner between the headstock and tailstock.

52. A method of scanning an image using a rotary image scanner, the method comprising the steps of:
providing a rotatable drum upon which said image may be mounted, said drum having a first mounting surface at a first end of the drum which varies in diameter as a direction parallel to a longitudinal axis of the drum is traversed and a second mounting surface at a second end of the drum opposite the first end which varies in diameter as a direction parallel to a longitudinal axis of the drum is traversed;

providing a headstock for contacting and supporting the first end of said drum, the headstock having a surface which varies in diameter in a direction parallel to a longitudinal axis of the drum;

providing a tailstock for contacting and supporting the second end of the drum, the tailstock having a surface which varies in diameter in a direction parallel to a longitudinal axis of the drum;

placing the drum on a drum support which supports a drum being loaded into the scanner, the support holding the drum between the tailstock and the headstock below the normal scanning position of the drum; and engaging a carriage closing mechanism which causes the relative separation between the headstock and tailstock to decrease while the drum is supported by the drum support, said separation decrease causing said headstock surface to contact the first mounting surface of the drum and said tailstock surface to contact the second tapered mounting surface of the drum and lift the drum off of the drum support and into a scanning position.

53. A method according to claim 52 wherein said step of providing said tailstock comprises the step of providing a tailstock for which said surface is a substantially annular, tapered surface.

54. A method according to claim 53 wherein said step of providing said drum comprises the step of providing a drum for which said second mounting surface approximates a spherical surface segment.

55. A method according to claim 54 further comprising the step of providing said tailstock with a second substantially annular surface having a diameter which changes along a direction parallel to a longitudinal axis of the drum, and providing a second rotatable drum having a different diameter than the first diameter drum, the second drum having a first mounting surface at a first end and a second mounting surface at a second end, said second mounting surface of the second drum being sized to make contact with the second substantially annular surface of the tailstock when the second drum is mounted on the scanner.

56. A method according to claim 55 wherein said step of placing the drum on said drum support comprises the steps of
placing one of said drums on the drum support; and
adjusting the drum support such that the height at which it provides support is such that it accommodates a particular drum which is placed upon it and maintains it in a position just below a normal scanning position.

57. A method according to claim 52 wherein said step of placing the drum on said drum support comprises the step of placing the drum on a drum support comprising a plurality of support arms, each of which cradles a curved surface of the drum.

58. A method according to claim 52 wherein said step of providing a headstock further comprises the step of providing a headstock said surface of which includes a mounting stud which is concentric with a rotational axis of the scanner.

59. A method according to claim 52 wherein said step of providing a headstock further comprises the steps of providing a headstock which includes a drive pawl, and wherein said step of providing a drum comprises the step of providing a drum having a drive opening which engages the drive pawl, the drive opening being formed by a fixed stop and a movable stop between which the drive pawl may reside, the movable stop being elastically biased to allow expansion of the opening while the drum is being mounted on the scanner.

60. A method of scanning an image on a multiple-drum rotary image scanner comprising the steps of:

providing a drum carriage comprising a headstock and a tailstock for supporting one of a plurality of drums of different diameters, wherein the relative separation between said headstock and said tailstock is different when different of said drums are mounted on the scanner;

detecting which of a plurality of drums is mounted on the scanner with a drum sensing device that outputs a drum signal indicative of which drum is detected, and providing a carriage position sensor which detects the relative separation of the headstock and tailstock;

providing a scanning head for receiving light from the surface of a drum mounted in the scanner; and adjusting the position of the scanning head in response to the drum signal.

61. A method according to claim 60 wherein said step of providing a carriage position sensor further comprises the step of providing a plurality of photodetectors each of which has a signal output which changes when the headstock and tailstock are at a different relative separation.

62. A method according to claim 60 further comprising the steps of:

illuminating a surface of the drum with a transmittance illuminator that is located within the drum during scanning; and adjusting the position of the transmittance illuminator with a transmittance illuminator adjuster that responds to said drum signal.

63. A method according to claim 62 wherein said step of illuminating a surface of the drum with a transmittance illuminator comprises the step of illuminating said surface of the drum with a transmittance illuminator which comprises an optical fiber bundle.

64. A method of changing a scanning position of a multiple-drum rotary image scanner for accommodating drums of different diameters, the method comprising the steps of:

providing a scanning head which receives light from a surface of the drum and directs the light along a first optical path;

redirecting the light from the first optical path to an input optical path with a movable mirror;

receiving light along the input optical path with an optics box and converting it to a scanning signal;

adjusting the position of the scanning head relative to the optics box such that the scanning head is at a different position relative to a rotational axis of the scanner and such that said light directed from the scanning head travels along a second optical path; and changing the orientation of the movable mirror such that it redirects light from the second optical path to said input optical path.

65. A method according to claim 64 wherein said step of changing the orientation of the movable mirror comprises the step of pivoting said mirror about an axis.

66. A method according to claim 65 wherein said step of changing the orientation of the movable mirror comprises the step of changing the orientation of the movable mirror against the bias of an elastic element.

67. A method according to claim 64 wherein said step of changing the orientation of the movable mirror comprises providing an actuator which responds to movement of the scanning head relative to the optics box such that when the position of the scanning head is adjusted, said actuator causes the orientation of the movable mirror to change.

68. A method according to claim 67 wherein said step of providing an actuator comprises the step of providing an actuator pin which is fixed in position relative to the scanning head and an actuator bracket which is pivotably connected to the optics box.

69. A method according to claim 64 wherein said step of adjusting the position of the scanning head comprises the step of adjusting the position of the scanning head such that said second optical path is substantially equal in length to said first optical path.

* * * * *